(12) United States Patent
Sasagawa et al.

(10) Patent No.: US 11,105,969 B2
(45) Date of Patent: Aug. 31, 2021

(54) DISPLAY DEVICE AND INPUT DEVICE

(71) Applicant: PANASONIC INTELLECTUAL PROPERTY MANAGEMENT CO., LTD., Osaka (JP)

(72) Inventors: Yuma Sasagawa, Aichi (JP); Masaki Kontani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 16/267,478

(22) Filed: Feb. 5, 2019

(65) Prior Publication Data

US 2019/0250321 A1     Aug. 15, 2019

(30) Foreign Application Priority Data

Feb. 9, 2018 (JP) .............................. JP2018-022174
Feb. 20, 2018 (JP) .............................. JP2018-027976
Sep. 11, 2018 (JP) .............................. JP2018-170042

(51) Int. Cl.
*G06F 3/00* (2006.01)
*F21V 8/00* (2006.01)
(Continued)

(52) U.S. Cl.
CPC ......... *G02B 6/0031* (2013.01); *G02B 6/0068* (2013.01); *G02B 6/0095* (2013.01);
(Continued)

(58) Field of Classification Search
CPC .. G02B 6/0031; G02B 6/0068; G02B 6/0095; G06F 3/0412; G06F 3/0414; G09G 3/22; G09F 13/22; F21K 9/50
See application file for complete search history.

(56) References Cited

U.S. PATENT DOCUMENTS 1,930,359 A * 10/1933 Hilgenberg .......... G02B 6/0071
                                                                40/442
1,937,957 A * 12/1933 Hotchner ................ G02B 6/006
                                                                40/546
(Continued)

FOREIGN PATENT DOCUMENTS

JP      2004-333361       11/2004
JP      2012-163961        8/2012
(Continued)

*Primary Examiner* — Gerald J Sufleta, II
(74) *Attorney, Agent, or Firm* — Greenblum & Bernstein, P.L.C.

(57) ABSTRACT

A display device that includes first and second light sources, a light guide body, and a mask body is provided. The light guide body includes a reflector that has a shape of a first design. The light guide body guides first light emitted by the first light source and reflects the first light by the reflector to display the first design. The mask body includes a light-transmissive portion and a light-blocking portion. The light-transmissive portion has a shape of a second design, and the light-blocking portion is a portion other than the light-transmissive portion. The light-transmissive portion transmits second light emitted by the second light source to display the second design. The first design is displayed at a first display luminance, and the second design is displayed at a second display luminance. The first display luminance and the second display luminance are substantially equalized.

15 Claims, 16 Drawing Sheets

(51) Int. Cl.
*G06F 3/041* (2006.01)
*G09G 3/22* (2006.01)

(52) U.S. Cl.
CPC .......... *G06F 3/0412* (2013.01); *G06F 3/0414* (2013.01); *G09G 3/22* (2013.01); *G09G 2320/0233* (2013.01)

(56) References Cited

U.S. PATENT DOCUMENTS

| | | | | |
|---|---|---|---|---|
| 2,810,225 | A * | 10/1957 | Hardesty | G02B 6/0021 40/546 |
| 5,265,357 | A * | 11/1993 | Yu | G09F 19/12 362/604 |
| 6,113,149 | A * | 9/2000 | Dukatz | B42D 15/00 283/109 |
| 6,171,117 | B1 * | 1/2001 | Chien | F21S 8/035 362/84 |
| 9,360,613 | B2 * | 6/2016 | Sakai | G02B 6/0021 |
| 10,062,308 | B2 * | 8/2018 | Young | G09F 13/00 |
| 10,611,300 | B2 * | 4/2020 | Buelow | B60Q 3/62 |
| 2004/0246203 | A1 * | 12/2004 | Nakaoka | G09F 9/3023 345/39 |
| 2004/0255497 | A1 * | 12/2004 | Venkataraman | G09F 13/0404 40/551 |
| 2005/0213351 | A1 * | 9/2005 | Yang | B60Q 1/323 362/633 |
| 2012/0200475 | A1 * | 8/2012 | Baker | G09F 13/06 345/4 |
| 2012/0218761 | A1 * | 8/2012 | Lohneis | G09F 13/22 362/249.04 |
| 2014/0268876 | A1 * | 9/2014 | Lee | G09F 19/12 362/612 |
| 2016/0025906 | A1 * | 1/2016 | Liu | B32B 27/08 40/544 |
| 2016/0169464 | A1 * | 6/2016 | Hirano | F21S 8/04 362/362 |
| 2016/0272111 | A1 * | 9/2016 | Teng | F21V 3/02 |
| 2017/0072800 | A1 * | 3/2017 | Fujita | G01D 7/06 |
| 2018/0111546 | A1 * | 4/2018 | Salter | B60Q 3/20 |
| 2018/0345846 | A1 * | 12/2018 | Alisafaee | F21S 43/249 |
| 2019/0039510 | A1 * | 2/2019 | Chen | B60Q 1/323 |
| 2019/0065800 | A1 * | 2/2019 | Nagata | G06K 7/10821 |
| 2019/0217772 | A1 * | 7/2019 | Ueno | B60K 15/05 |

FOREIGN PATENT DOCUMENTS

| | | |
|---|---|---|
| JP | 6173580 | 7/2017 |
| WO | 2015/056046 | 4/2015 |

* cited by examiner

DISPLAY DEVICE AND INPUT DEVICE

CROSS REFERENCE TO RELATED APPLICATIONS

The present application is based on and claims priority of Japanese Patent Application No. 2018-022174 filed on Feb. 9, 2018, Japanese Patent Application No. 2018-027976 filed on Feb. 20, 2018, and Japanese Patent Application No. 2018-170042 filed on Sep. 11, 2018.

BACKGROUND

1. Technical Field

The present disclosure relates to a display device and an input device.

2. Description of the Related Art

Japanese Unexamined Patent Application Publication No. 2004-333361 discloses a display device which includes a first light source for displaying a first design at all times via a light guide plate, and a second light source for displaying a second design as necessary through a shade part.

Japanese Unexamined Patent Application Publication No. 2012-163961 discloses a display device which selectively displays one of two graphics by switching the lighting between a first light source and a second light source.

SUMMARY

However, the conventional display devices according to Japanese Unexamined Patent Application Publication No. 2004-333361 and Japanese Unexamined Patent Application Publication No. 2012-163961 can be improved upon.

In view of this, the present disclosure provides a display device and an input device which are capable of improving upon the above related arts.

A display device according to one aspect of the present disclosure is a display device which includes: a first light source; a second light source; a light guide body which includes a reflector having a shape of a first design, guides first light emitted by the first light source, and reflects the first light by the reflector to display the first design; and a mask body which includes a light-transmissive portion having a shape of a second design and a light-blocking portion that is a portion other than the light-transmissive portion, transmits, through the light-transmissive portion, second light emitted by the second light source, and blocks the second light by the light-blocking portion. In the display device, the first design is displayed at a first display luminance and the second design is displayed at a second display luminance, and the first display luminance and the second display luminance are substantially equalized by adjusting at least one of a luminance of the first light and a luminance of the second light.

In addition, a display device according to another aspect of the present disclosure includes: a first light source and a second light source, either one of which is selectively turned on; a light guide body which includes a reflector having a shape of a first design, guides first light emitted by the first light source, and reflects the first light by the reflector to display the first design; a mask body which includes a light-transmissive portion having a shape of a second design and a light-blocking portion that is a portion other than the light-transmissive portion, transmits, through the light-transmissive portion, second light emitted by the second light source, and blocks the second light by the light-blocking portion; a board on which the first light source and the second light source are disposed; a separator wall which separates the first light source and the second light source, and has a light-blocking property. In the display device, the board and the separator wall are connected in a state in which light is blocked between a first space in which the first light source is disposed and a second space in which the second light source is disposed.

The display device and the input device according to the present disclosure are capable of improving upon the above related arts.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
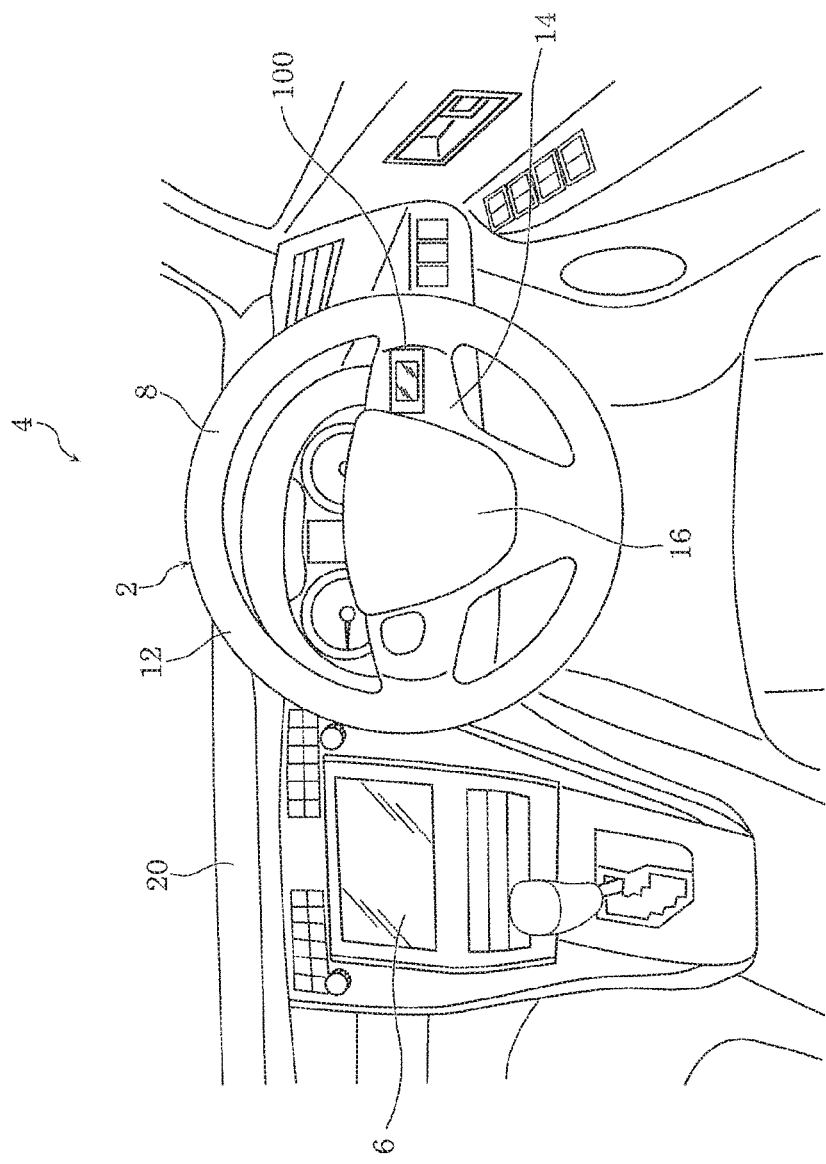
FIG. 1 is a diagram which illustrates one example of a vehicle interior of a vehicle in which a steering input device according to Embodiment 1 is installed.

Underlying Knowledge Forming the Basis of the Present Disclosure

The inventors found that the following problems occur with the display device described in the "Description of the Related Art" section.

With the display device according to Japanese Unexamined Patent Application Publication No. 2004-333361, there is a possibility that a luminance for displaying the first design might be different from a luminance for displaying the second design. More specifically, with conventional display devices, a first design is displayed using light emitted by a first light source via a light guide plate and a second design is displayed using direct light emitted by a second light source, and thus a path of light for displaying the first design is different from a path of light for displaying the second design. For that reason, when the luminance of the first light source and the luminance of the second light source are same, the first design and the second design are likely to be displayed at different luminances, leading to a possible damage to the visual quality of the first design and the second design.

In view of the above, the present disclosure provides a display device capable of improving the visual quality of the first design and the second design which are displayed using light traveling through paths of light of different types.

In order to solve the above-described problem, the display device according to one aspect of present disclosure is a display device which includes a first light source; a second light source; a light guide body which includes a reflector having a shape of a first design, guides first light emitted by the first light source, and reflects the first light by the reflector to display the first design; and a mask body which includes a light-transmissive portion having a shape of a second design and a light-blocking portion that is a portion other than the light-transmissive portion, transmits, through the light-transmissive portion, second light emitted by the second light source, and blocks the second light by the light-blocking portion. In the display device, the first design is displayed at a first display luminance and the second design is displayed at a second display luminance, and the first display luminance and the second display luminance are substantially equalized by adjusting at least one of a luminance of the first light and a luminance of the second light.

According to this configuration, at least one of the luminance of the first light and the luminance of the second light is adjusted, and thus it is possible to equalize the first display luminance for displaying the first design and the second display luminance for displaying the second design. It is thus possible to improve the visual quality of the first design and the second design which are displayed using light traveling through paths of light of different types.

In addition, the display device may further include an adjuster which adjusts at least one of the luminance of the first light and the luminance of the second light to substantially equalize the first display luminance at which the first design is displayed and the second display luminance at which the second design is displayed.

According to this configuration, the adjuster adjusts at least one of the luminance of the first light and the luminance of the second light, and thus it is possible to equalize the first display luminance for displaying the first design and the second display luminance for displaying the second design. Accordingly, it is possible to improve the visual quality of the first design and the second design.

In addition, the adjuster may adjust the at least one of the luminance of the first light and the luminance of the second light by causing feed power to differ between the first light source and the second light source.

Accordingly, it is possible to easily adjust at least one of the luminance of the first light and the luminance of the second light.

In addition, the adjuster may adjust at least one of the luminance of the first light and the luminance of the second light by causing feed current to differ between the first light source and the second light source.

Accordingly, it is possible to easily adjust at least one of the luminance of the first light and the luminance of the second light.

In addition, the first light source and the second light source may comprise light sources of the same type.

According to this configuration, the adjuster adjusts feed power or feed current to be fed to the first light source and the second light source which comprise light sources of the same type, thereby making it possible to easily adjust at least one of the luminance of the first light and the luminance of the second light.

In addition, the adjuster may adjust the luminance of the first light to be higher than the luminance of the second light.

According to this configuration, the adjuster adjusts the luminance of the first light for displaying the first design displayed using the light guide body and likely to be lower in luminance than the second design displayed using transmitted light, to be higher than the luminance of the second light. Accordingly, the adjuster is capable of substantially equalizing the first display luminance at which the first design is displayed and the second display luminance at which the second design is displayed. It is thus possible to improve the visual quality of the first design and the second design.

In addition, the adjuster may include a lens which is disposed above the first light source on a side to which the first light is emitted, and collects the first light.

According to this configuration, it is possible to collect light emitted by the first light source, by disposing the lens above the first light source on the side to which the first light is emitted. It is thus possible to adjust the luminance of the first light to be higher than the luminance of the second light.

In addition, the adjuster may include a light reducer which is disposed above the second light source on a side to which the second light is emitted, and reduces a light amount of the second light.

According to this configuration, it is possible to reduce light emitted by the second light source, by disposing the light reducer above the second light source on the side to which the second light is emitted. It is thus possible to adjust the luminance of the first light to be higher than the luminance of the second light.

In addition, the adjuster may include a light diffuser which is disposed above the second light source on a side to which the second light is emitted, and diffuses the second light.

According to this configuration, it is possible to diffuse light emitted by the second light source, by disposing the light diffuser above the second light source on the side to which the second light is emitted. It is thus possible to adjust the luminance of the first light to be higher than the luminance of the second light.

In addition, the adjuster may cause the second light source to blink at a duty ratio less than a duty ratio of the first light source.

Accordingly, it is possible to easily adjust the luminance of the first light to be higher than the luminance of the second light.

In addition, the first light source includes one or more light emitting elements and the second light source includes one or more light emitting elements, and the one or more light emitting elements of the first light source may be different in number from the one or more light emitting elements of the second light source.

Accordingly, it is possible to easily adjust the luminance of the first light and the luminance of the second light.

In addition, the display device may further include a board on which the first light source and the second light source are disposed. In the display device, the first light source and the second light source may be disposed at different heights from the board.

Accordingly, it is possible to easily adjust the luminance of the first light and the luminance of the second light.

In addition, the display device may further include a separator wall which separates the first light source and the second light source. The separator wall may include a wall surface having one of a dark portion, a matte portion, and a diffused reflection portion, on a side facing the second light source.

With this configuration, the separator wall is capable of reducing reflectance of the second light, and thus it is possible to adjust the luminance of the second light to be lower than the luminance of the first light. Accordingly, it is possible to easily adjust the luminance of the first light to be higher than the luminance of the second light.

In addition, the first design and the second design may be displayed at overlapping positions.

In the case where the first design and the second design are disposed at overlapping positions, a difference between a luminance of the first design and a luminance of the second design is likely to be particularly distinct when the first design and the second design are displayed at different luminances. However, even when the first design and the second design are disposed at such positions where a difference is likely to be distinct, it is possible to substantially equalize the luminance for displaying the first design and the luminance for displaying the second design. It is thus possible to improve the visual quality of the first design and the second design.

In addition, only one of the first light source and the second light source may be turned on at a time.

With this configuration, since the luminance at which the first design is displayed and the luminance at which the second design is displayed are substantially equalized even when either one of the first design and the second design is displayed, the luminance at which the first design is displayed and the luminance at which the second design is displayed are substantially equalized as well even at the time when display is switched. It is thus possible to improve the visual quality of the first design and the second design.

Furthermore, Japanese Unexamined Patent Application Publication No. 2004-333361 and Japanese Unexamined Patent Application Publication No. 2012-163961 pose problems as follows.

Japanese Unexamined Patent Application Publication No. 2004-333361 discloses a configuration in which the first light source housing and the second light source housing house the first light source and the second light source, respectively; that is, a configuration in which a separator wall is disposed between the first light source and the second light source. The first light source housing and the second light source housing comprise a plurality of first light source housings and a plurality of second light source housings, respectively, so as to respectively correspond to a plurality of first light sources and a plurality of second light sources. The plurality of first light source housings and the plurality of second light source housings are integrated to form a light guide housing. The plurality of first light sources and the plurality of second light sources are disposed on a single board. Accordingly, the light guide housing is disposed on the board so as to house the plurality of first light sources and the plurality of second light sources in the plurality of first light source housings and the plurality of second light source housings.

In this case, the light guide housing has a configuration in which the plurality of first light source housings and the plurality of second light source housings are integrally formed, and thus a dimensional error is likely to occur in a plurality of partition walls provided between the plurality of first light sources and the plurality of second light sources. In addition, since the plurality of first light sources and the plurality of second light sources are disposed on a single board, the board increases in size and thus deflection is likely to occur. Accordingly, it is difficult to closely attach the light guide housing uniformly to the board. As described above, in the case where the light guide housing and the board are not closely attached and a gap is formed between them, light emitted by the first light sources leaks to the second light source housings or light emitted by the second light sources leaks to the first light source housings; that is, light leakage occurs, leading to a possible damage to the visual quality of the first design and the second design. In particular, in a configuration in which turning on of the first light sources and turning on of the second light sources are switched therebetween, as described in Japanese Unexamined Patent Application Publication No. 2012-163961, the light leakage could cause light emitted by the first light sources to display the second design, or cause light emitted by the second light sources to display the first design.

In addition, in Japanese Unexamined Patent Application Publication No. 2012-163961, the second light sources are not sufficiently isolated, and thus light emitted by the second light sources could reach a light pipe that transmits light emitted by the first light sources. More specifically, although an arm is disposed outside the second light sources, the arm could fail to block light emitted by the second light sources. For example, in the case where (i) the arm is formed using a light-transmissive component, or (ii) there is a gap, opening, or the like which penetrates between a space in which the second light sources are disposed and a space in which the light pipe is disposed, there is a possibility that light emitted by the second light sources could not be effectively prevented from entering the light pipe. For that reason, when a second graphic is displayed using light emitted by the second light sources, there is a possibility that a first graphic displayed using light emitted by the first light sources might be accidentally reflected.

In addition, Japanese Unexamined Patent Application Publication No. 2004-333361 and Japanese Unexamined Patent Application Publication No. 2012-163961 are silent on a material of the board. Accordingly, when the board is formed using a light-transmissive material, there is a possibility that light emitted by one of the first light source and the second light source might propagate inside the board and dimly illuminate a space in which the other is disposed. Accordingly, as described above, there is a possibility that light emitted by the first light sources would display the second design or light emitted by the second light sources would display the first design.

As described above, with the techniques described in Japanese Unexamined Patent Application Publication No. 2004-333361 and Japanese Unexamined Patent Application Publication No. 2012-163961 as described above, there is a problem that it is difficult to selectively and independently display the first design and the second design.

In order to solve the above-described problems, the inventors of the present application have found, after earnest investigation, a display device having a configuration described below.

A display device according to one aspect of the present disclosure is a display device which further includes a board on which the first a separator wall which separates the first light source and the second light source, and has a light-blocking property. In the display device, either one of the first light source and the second light source is selectively turned on, and the board and the separator wall are connected in a state in which light is blocked between a first space in which the first light source is disposed and a second space in which the second light source is disposed.

With this configuration, when the first light sources emit light, it is possible to reduce leakage of first light emitted by the first light sources, into the second space from the connecting portion between the board and the separator wall. Likewise, when the second light sources emit light, it is possible to reduce leakage of second light emitted by the second light sources, into the first space from the connecting portion between the board and the separator wall. It is thus possible to reduce the second designs being reflected while the first designs are displayed, and to reduce the first designs being reflected while second designs are displayed. In this manner, it is possible to selectively and independently display the first design and the second design.

In addition, the board and the separator wall may be connected by filling a filler having a light-blocking property in a space between the board and the separator wall.

With this configuration, it is possible to effectively block light between the first space and the second space in the connecting portion between the board and the separator wall.

In addition, the filler may have a surface which is dark in color.

With this configuration, it is possible to reduce the first light emitted by the first light sources or the second light emitted by the second light sources being reflected by the filler. Accordingly, it is possible to reduce light being diffusely reflected by the filler, making it possible to effectively block light between the first space and the second space.

In addition, the filler may be a rubber or an adhesive.

Accordingly, it is possible to easily fill a gap in the connecting portion between the board and the separator wall. It is thus possible to effectively block light between the first space and the second space in the connecting portion between the board and the separator wall.

In addition, the board and the separator wall may be connected by inserting the separator wall into a recess or a through-hole provided in the board.

With this configuration, the separator wall is capable of separating the first space from the second space while a gap at the connecting portion being reduced to the minimum. In addition, the board includes a recess or a through-hole, and thus even when light propagates inside the board, the propagation of the light is blocked by the recess or the through-hole. It is thus possible to effectively block light between the first space and the second space in the connecting portion between the board and the separator wall.

In addition, the board may include a material having a light-blocking property.

Accordingly, it is possible to prevent leakage of light from the board, and thus to block light between the first space and the second space. In addition, since the board has a light-blocking property, it is possible to reduce the possibility of light propagating inside the board from one space to the other space as in a general glass epoxy board, and dimly illuminating the other space.

In addition, the separator wall may have a surface which is dark in color.

Accordingly, it is possible to reduce light being diffusely reflected by the surface of the separator wall, making it possible to effectively block light between the first space and the second space.

In addition, the board may have a surface which is dark in color.

Accordingly, it is possible to reduce light being diffusely reflected by the surface of the board, making it possible to effectively block light between the first space and the second space.

In addition, further, a lens which is disposed above at least one of the first light source and the second light source on a side to which light is emitted, and collects the light may be included.

With this configuration, it is possible to collect light of at least one of the first light source and the second light source using the lens, making it possible to reduce the first light of the first light source traveling toward the second space, or reduce the second light of the second light source traveling toward the first space. It is thus possible to effectively block light between the first space and the second space in the connecting portion between the board and the separator wall.

An input device according to one aspect of the present disclosure includes: the above-described display device; and a switch which detects pressure on the display device.

Accordingly, when the first light sources emit light, it is possible to reduce leakage of first light emitted by the first light sources, into the second space from the connecting portion between the board and the separator wall. Likewise, when the second light sources emit light, it is possible to reduce leakage of second light emitted by the second light sources, into the first space from the connecting portion between the board and the separator wall. It is thus possible to reduce the second design being reflected while the first design is displayed, and to reduce the first design being reflected while the second design is displayed. In this manner, the input device is capable of selectively and independently displaying the first design and the second design.

In addition, with the input device, the display device may press the switch by moving toward the switch, upon being applied with the pressure.

In addition, with the input device, the separator wall may be connected to the board in a state in which, upon being applied with the pressure, the separator wall is movable toward the switch relative to the board, while keeping a state in which light is blocked at a connecting portion between the board and the separator wall.

Hereinafter, an input device which includes a display device according to one aspect of the present disclosure will be described with reference to the drawings.

It should be noted that each of the exemplary embodiments described below shows one specific example of present disclosure. The numerical values, shapes, materials, structural components, the arrangement and connection of the structural components, steps, the processing order of the steps, etc. shown in the following embodiments are mere examples, and therefore do not limit the scope of the claims of present disclosure. Therefore, among the structural components in the following exemplary embodiments, structural components not recited in any one of the independent claims are described as arbitrary structural elements.

Embodiment 1

(1-1. Configuration of Steering Input Device)

Figure 2:
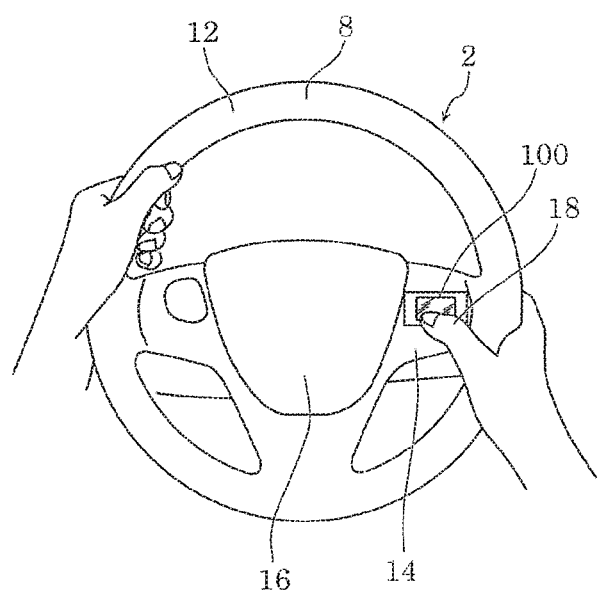
FIG. 2 is a diagram which illustrates a use example of the steering input device according to Embodiment 1.

First, a configuration of steering input device 2 according to Embodiment 1 will be described with reference to FIG. 1 and FIG. 2. FIG. 1 is a diagram which illustrates one example of a vehicle interior of a vehicle in which steering input device 2 according to Embodiment is installed. FIG. 2 is a diagram which illustrates a use example of steering input device 2 according to Embodiment 1.

In the vehicle interior of automobile 4 (one example of the vehicle) illustrated in FIG. 1, steering input device 2 and on-vehicle device 6 are installed. Steering input device 2 according to Embodiment 1 includes steering wheel 8 and display device 100.

Steering wheel 8 is for steering automobile 4. Steering wheel 8 includes rim 12 having a ring shape, spoke 14 having a substantially T-shape and formed integrally with rim 12 on an inner circumference surface of rim 12, and horn switch cover 16 which covers a horn switch (not illustrated) disposed at a center portion of spoke 14.

Display device 100 is for operating on-vehicle device 6, and is disposed on spoke 14 of steering wheel 8, for example. As illustrated in FIG. 2, a driver who is a user of display device 100 performs an input operation on display device 100 with finger 18 (one example of an operation object) of the right hand gripping rim 12, thereby operating on-vehicle device 6. A configuration of display device 100 will be described later in detail.

On-vehicle device 6 is, for example, an audio device for reproducing an optical disc such as a compact disc, etc. On-vehicle device 6 is placed in dashboard 20, for example. A configuration of on-vehicle device 6 will be described later in detail.

[1-2. Configuration of Display Device]

Figure 3:
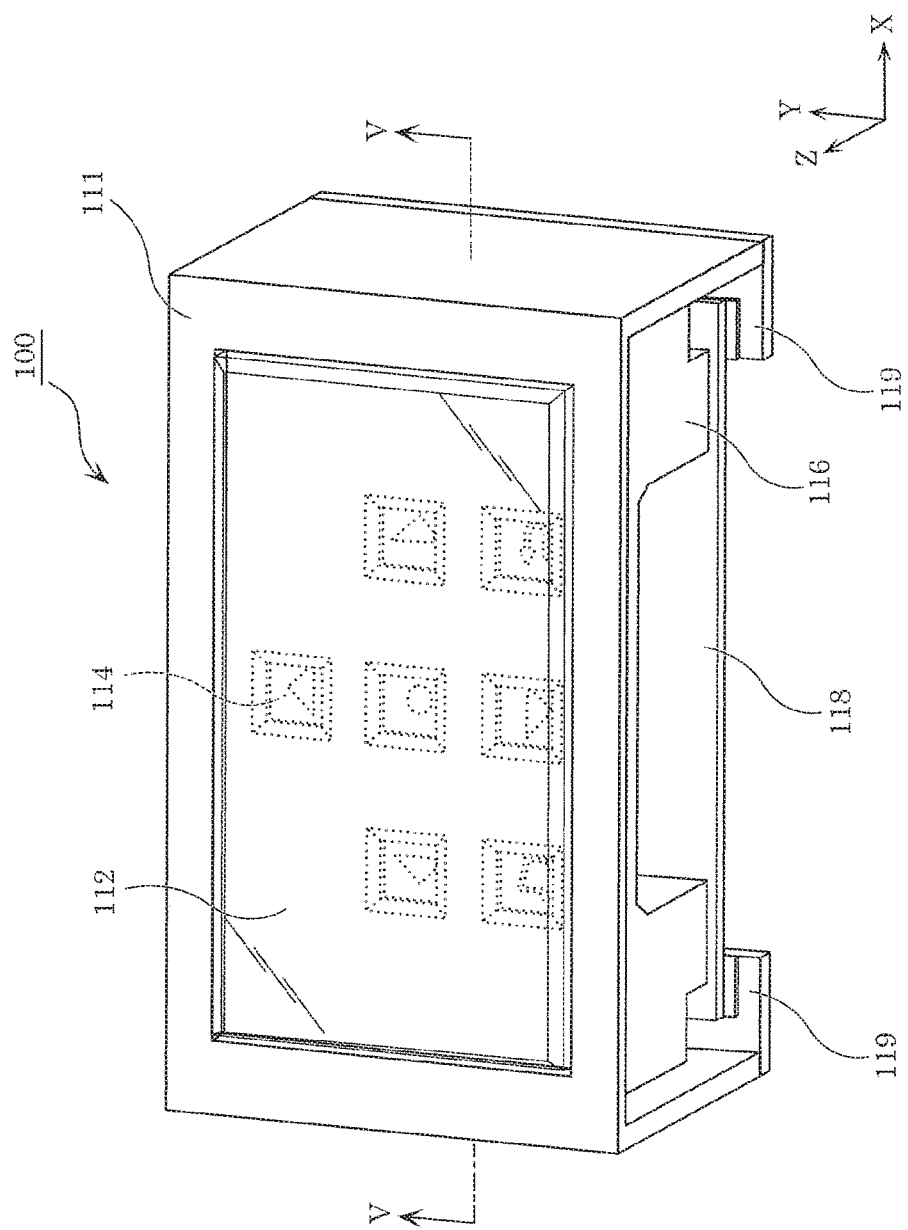
FIG. 3 is an external perspective view of a display device according to Embodiment 1.
Figure 4:
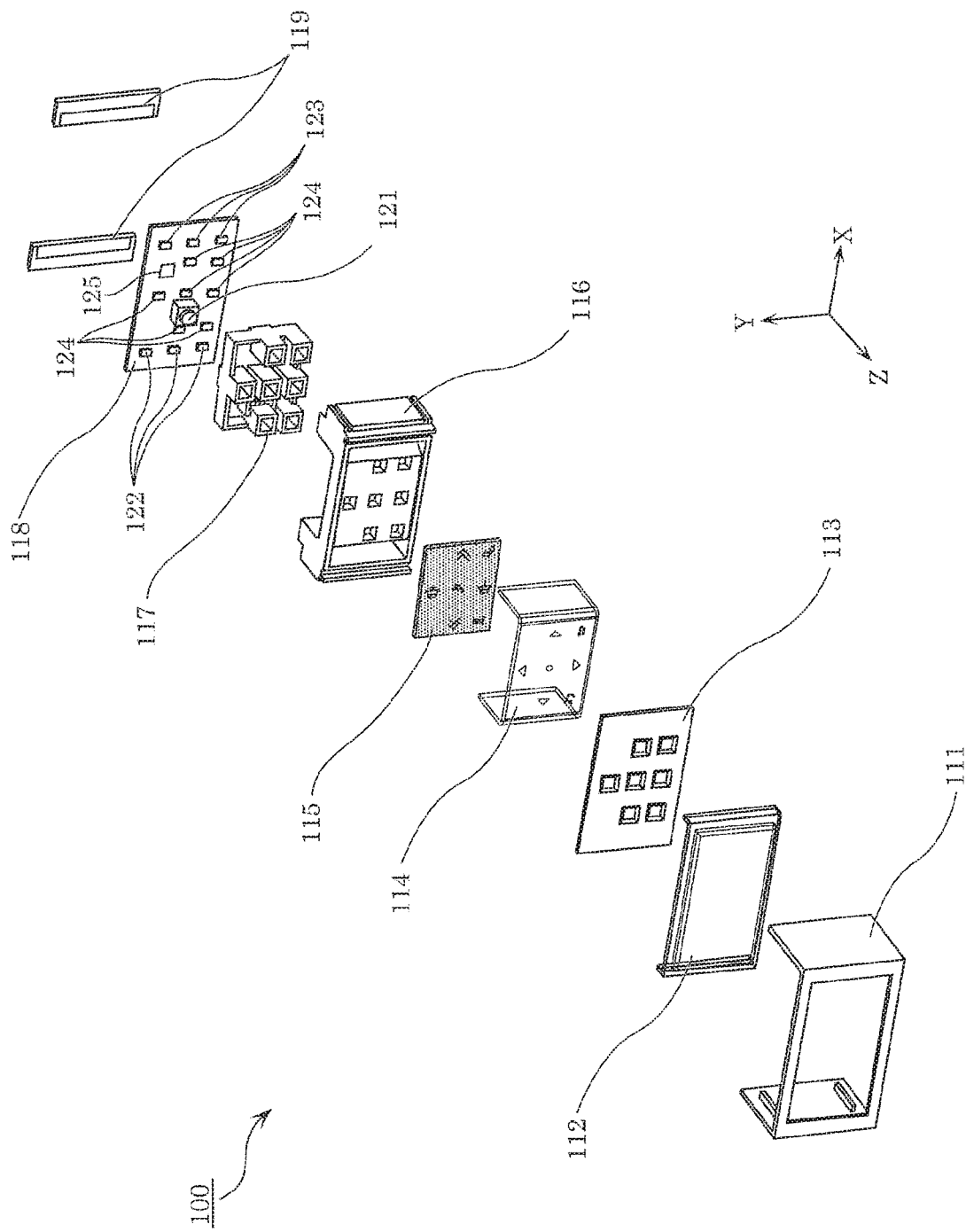
FIG. 4 is an exploded perspective view of the display device according to Embodiment 1.
Figure 5:
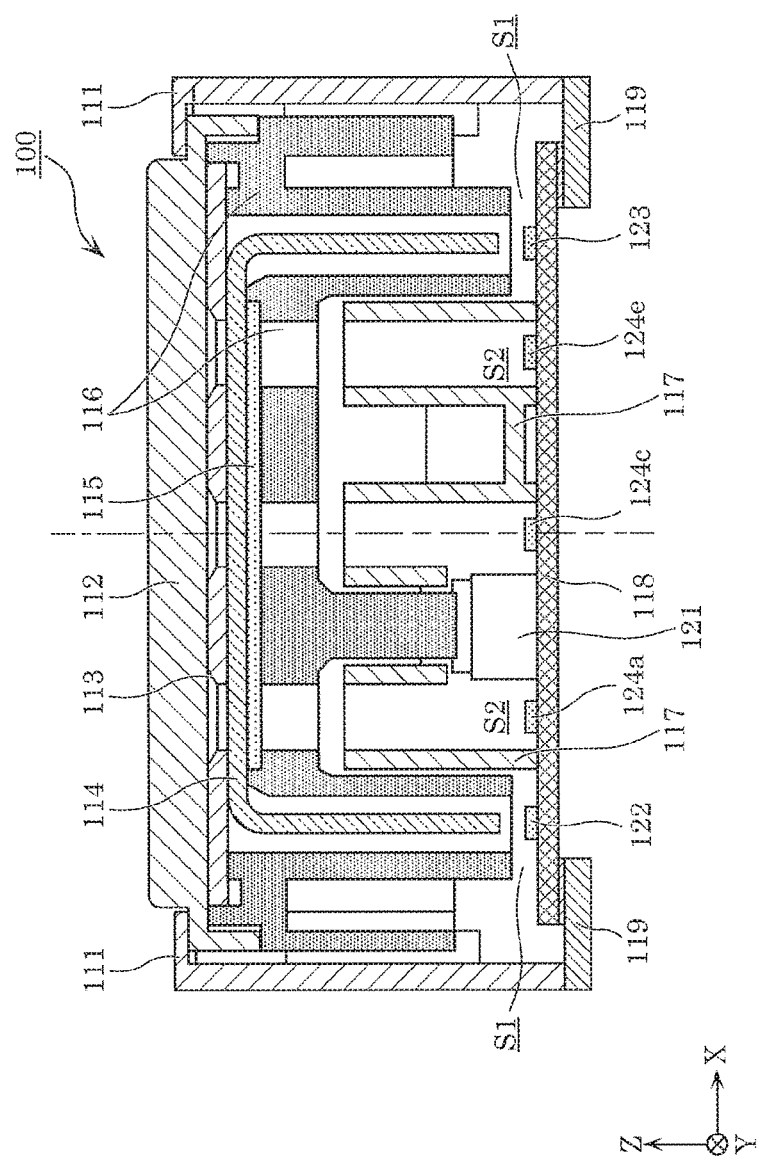
FIG. 5 is a cross-sectional view taken along V-V in FIG. 3.

The following describes a configuration of display device 100 according to Embodiment 1, with reference to FIG. 3 to FIG. 7. FIG. 3 illustrates an external perspective view of display device 100 according to Embodiment 1. FIG. 4 is an exploded perspective view of display device 100 according to Embodiment 1. FIG. 5 is a cross-sectional view taken along V-V in FIG. 3.

As illustrated in FIG. 3 to FIG. 5, display device 100 according to Embodiment 1 includes: light guide body 114; mask body 115; separator wall 117; and board 118 on which first light sources 122 and 123 and second light sources 124 are disposed. Display device 100 may further include: outer frame 111; touch sensor 112; window frame 113; pressure portion 116; and bottom frame 119.

Outer frame 111 is a component constituting an outer periphery of a front surface and side surfaces of display device 100. Outer frame 111 includes, for example, a resin material, etc.

Touch sensor 112 is a sensor which is disposed on a front-surface side (a Z-axis positive side) of display device 100, and detects a touch position on the front surface. The touch position is a position touched by a user. Touch sensor 112 is located on the Z-axis positive side with respect to pressure portion 116, and detects a touch position on an operation surface of pressure portion 116 that is a surface of pressure portion 116 on the Z-axis positive side. It should be noted that first designs 141 to 146 and second designs 151 to 156 are displayed on a surface of touch sensor 112 on the Z-axis positive side. In other words, the surface of touch sensor 112 on the Z-axis positive side is a display screen.

It should be noted that the touch position may be a position touched by a body part of a user such as a finger, or a position touched by a conductive object. Touch sensor 112 is composed of a transparent member. Various types of touch sensors, such as a resistive touch sensor, a capacitive touch sensor, etc., can be employed as touch sensor 112.

Window frame 113 is a component which blocks light from a region other than reflectors having the shapes of the designs and are formed on light guide body 114. More specifically, window frame 113 is disposed forward of light guide body 114, and has openings each having a quadrilateral outer shape at the regions corresponding to the designs. Window frame 113 includes a material having a light-blocking property (for example, resin, etc.). According to this configuration, with display device 100, it is possible to reduce emitting of light from a portion other than the portions corresponding to reflectors which have the shapes of first designs 141 to 146 and are formed on light emission surface 131a (see the description thereof below) of light guide body 114, and to emit light exclusively from the portions corresponding to reflectors.

Light guide body 114 is a component which emits light (first light) forward from a light emission surface substantially parallel to an X-Y plane. The first light is emitted by first light sources 122 and 123 mounted on board 118. More specifically, light guide body 114 guides first light emitted by first light sources 122 and 123, and reflects the guided first light by reflectors having the shapes of first designs 141 to 146, thereby displaying first designs 141 to 146. Light guide body 114 is formed using a transparent material, such as an acrylic resin, a polycarbonate resin, etc.

Figure 6:
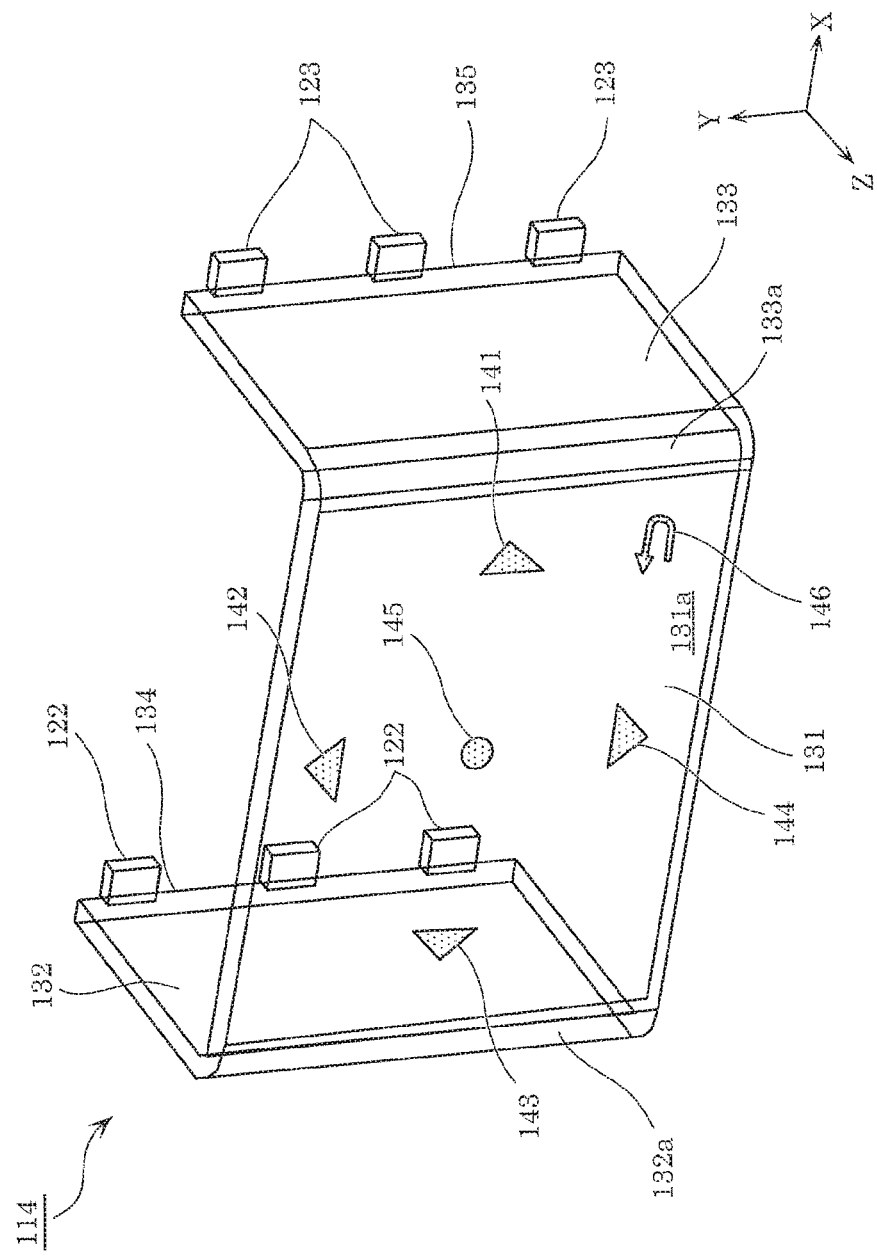
FIG. 6 is a perspective view which indicates a relationship between a light guide body and a first light source for displaying first designs corresponding to reflectors formed on the light guide body.

The following describes a detailed configuration of light guide body 114 according to Embodiment 1, with reference to FIG. 6.

FIG. 6 is a perspective view which indicates a relationship between light guide body 114 and first light sources 122 and 123 for displaying first designs 141 to 146 corresponding to reflectors formed on light guide body 114.

As illustrated in FIG. 6, light guide body 114 includes light emission portion 131 and light guiding portions 132 and 133.

Light emission portion 131 is a plate-shaped component disposed substantially parallel to the X-Y plane. Light emission portion 131 includes light emission surface 131a which emits light from a surface on the Z-axis positive side. The reflectors which have the shapes of first designs 141 to 146 indicating operation objects are formed on light emission surface 131a.

Light guiding portions 132 and 133 are plate-shaped portions which are connected to light emission portion 131 substantially at right angle, and are disposed substantially parallel to a Y-Z plane. Light guiding portions 132 and 133 include light entrance surfaces 134 and 135 which face first light sources 122 and 123, respectively, and are substantially parallel to the X-Y plane.

Light entrance surfaces 134 and 135 include first light entrance surface 134 which faces first light sources 122 and second light entrance surface 135 which faces first light sources 123. According to the present embodiment, first light entrance surface 134 is disposed at a position facing three first light sources 122, extending over the regions where the three first light sources 122 are disposed. Second light entrance surface 135 is disposed at a position facing three first light sources 123, extending over the regions where the three first light sources 123 are disposed.

In addition, light guiding portions 132 and 133 are portions of light guide body 114 which guide light entering through light entrance surfaces 134 and 135, to light emission surface 131a. Light guiding portions 132 and 133 include first light guiding portion 132 which guides, to light emission surface 131a, light entering through first light entrance surface 134, and second light guiding portion 133 which guides, to light emission surface 131a, light entering through second light entrance surface 135. First light guiding portion 132 and second light guiding portion 133 are respectively disposed at the ends in the X-axis direction of light emission portion 131, and are substantially parallel to each other. In other words, second light guiding portion 133 is opposite to first light guiding portion 132 across light emission surface 131a.

First light guiding portion 132 and second light guiding portion 133 are formed at an angle to light emission portion 131. More specifically, first light guiding portion 132 is connected to light emission portion 131 via curved portion 132a that is bent at an angle of approximately 90 degrees, and second light guiding portion 133 is connected to light emission portion 131 via curved portion 133a that is bent at an angle of approximately 90 degrees.

As described above, light guide body 114 has a configuration which guides light (first light) emitted by three first light sources 122 and three first light sources 123, through two light guiding portions 132 and 133 to light emission surface 131a. Accordingly, even when light emission surface 131a has relatively a broad surface for displaying a plurality of designs which indicate positions to be touched by a user, it is possible to reduce luminance non-uniformity occurring in the X-axis direction and the Y-axis direction on light emission surface 131a.

The reflectors are each formed by forming a groove or opening having a shape of inverted V with a tip on the light exit side, on a surface opposite to light emission surface 131a of light emission portion 131. More specifically, first designs 141 to 146 are displayed as a result of reflecting, toward the Z-axis positive side, light that is guided from light guiding portions 132 and 133 to light emission portion 131 and travels in the X-axis directions, by the reflectors each of which is a groove or an opening having a shape of inverted V. In addition, the reflectors are formed on light emission portion 131 so as to transmit light in the thickness direction (i.e., the Z-axis direction) of light guide body 114. Accordingly, light guide body 114 transmits, toward the Z-axis positive side, light emitted by second light sources 124 disposed on the Z-axis negative side relative to light emission portion 131.

Next, a detailed configuration of mask body 115 according to Embodiment 1 will be described with reference to FIG. 7.

Figure 7:
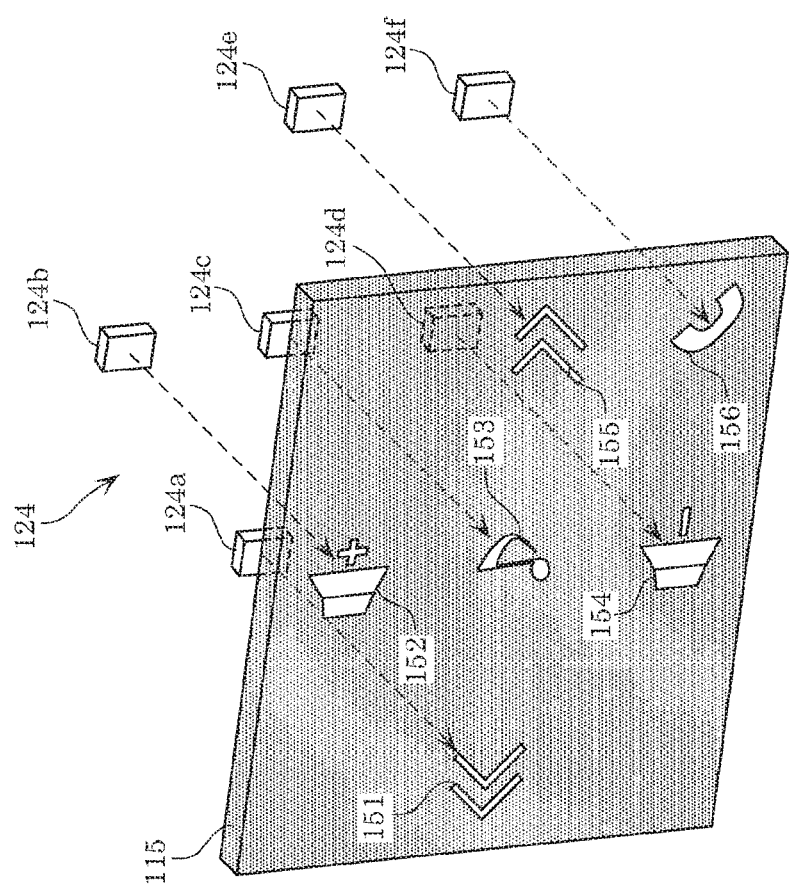
FIG. 7 is a perspective view which indicates a relationship between a mask body and second light sources for displaying second designs corresponding to light-transmissive portions formed on the mask body.

FIG. 7 is a perspective view which indicates a relationship between mask body 115 and second light sources 124 for displaying second designs 151 to 156 corresponding to light-transmissive portions formed on mask body 115.

As illustrated in FIG. 7, mask body 115 is a plate-shaped component having a substantially square shape, and includes the light-transmissive portions that have the shapes of second designs 151 to 156 and transmit light in the thickness direction (i.e., the Z-axis direction) of mask body 115. Mask body 115 blocks light in a portion other than the portions in which the light-transmissive portions having the shape of second designs 151 to 156 are formed. More specifically, mask body 115 includes (i) the light-transmissive portions which transmit second light emitted by second light sources 124 and have the shapes of second designs 151 to 156, and a light-blocking portion which is a portion of mask body 115 other than the light-transmissive portions and blocks the second light. In mask body 115, the light-blocking portion is formed using a material having a light-blocking property (for example, resin), and the light-transmissive portions are formed using a material having a light-transmissive property (for example, resin).

It should be noted that the light-transmissive portions of mask body 115 may be formed as through-holes having the shapes of the second designs in the light-blocking portion. Alternatively, mask body 115 may be formed by applying coating having a light-blocking property on a transparent plate-shaped component. More specifically, mask body 115 may have a configuration in which a coated film having a light-blocking property is disposed on the surface of the light-blocking portion, and the coated film is not disposed on the surfaces of the light-transmissive portions.

On mask body 115, the light-transmissive portions having the shapes of second designs 151 to 156 are formed at positions respectively corresponding to the positions of second light sources 124a to 124f disposed on the Z-axis negative side with respect to mask body 115. As illustrated in FIG. 4, pressure portion 116 and separator wall 117 which are later described are disposed between mask body 115 and board 118 on which second light sources 124a to 124f are disposed. Second light sources 124a to 124f are separated from one another by separator wall 117. Accordingly, each of second designs 151 to 156 receives light (second light) of a corresponding one of second light sources 124a to 124f.

In addition, mask body 115 is disposed on the Z-axis negative side with respect to light guide body 114, in a state in which mask body 115 overlaps with light emission portion 131 of light guide body 114. The light-transmissive portions having the shapes of second designs 151 to 156 are arranged at positions to overlap with the reflectors having the shapes of first designs 141 to 146. In other words, light guide body 114 and mask body 115 are arranged such that each of first designs 141 to 146 overlaps with a corresponding one of second designs 151 to 156. More specifically, first designs 141 to 146 and second designs 151 to 156 are displayed at overlapping positions. As described above, the regions in which the reflectors having the shapes of first designs 141 to 146 are provided and the regions in which the light-transmissive portions having the shapes of second designs 151 to 156 are provided overlap with each other and thus have substantially equivalent areas.

Pressure portion 116 is a component which is disposed forward of switch 121 that is mounted on board 118, and presses switch 121. In order to press switch 121, pressure portion 116 is supported by outer frame 111 on the side surfaces along the X-axis of pressure portion 116 so as to be slidable with respect to switch 121 in the Z-axis direction. Pressure portion 116 supports touch sensor 112, window frame 113, and light guide body 114. Accordingly, touch sensor 112, window frame 113, and light guide body 114 slide together with pressure portion 116 sliding in the Z-axis direction. It should be noted that an operation surface on which pressure portion 116 is pressed has a width greater than a width of a finger a person.

In addition, pressure portion 116 is provided with a plurality of openings which penetrate through pressure portion 116 in the Z-axis direction, and are located at positions respectively corresponding to the positions of the light-transmissive portions of mask body 115 which have the shapes of second designs 151 to 156. The plurality of openings each have a quadrilateral shape when viewed in the Z-axis direction. Accordingly, pressure portion 116 transmits light emitted by second light sources 124a to 124f that correspond to the light-transmissive portions having the shapes of second designs 151 to 156.

Pressure portion 116 includes, for example, a resin material, etc.

Separator wall 117 is a component which is disposed on board 118, separates between (i) first light sources 122 and 123 and (ii) second light sources 124a to 124f, and has a light-blocking property. More specifically, separator wall 117 includes, at least above board 118, walls respectively disposed between: first light source 122; first light source 123; second light source 124a; second light source 124b; second light source 124c; second light source 124d; second light source 124e; and second light source 124f, and reduces light emitted by these light sources reaching somewhere other than the corresponding reflectors or light-transmissive portions having the shapes of the designs. The walls included by separator wall 117 each have a square-tube shape disposed so as to correspond to a corresponding one of second light sources 124a to 124f. The space above board 118 is divided by separator wall 117 into first space S1 in which first light sources 122 and 123 are disposed and second space S2 in which second light sources 124 are disposed. In addition, separator wall 117 may have a surface which is dark in color.

Separator wall 117 includes, for example, a resin material, etc.

Board 118 is a wiring board which includes: switch 121; a plurality of first light sources 122 and 123; a plurality of second light sources 124; and control circuit 125. Switch 121, the plurality of first light sources 122 and 123, and the plurality of second light sources 124 are disposed on board 118, for example, and mounted on a main surface of board 118 that is a surface on the front-surface side (the Z-axis positive side). Board 118 may include a material having a light-blocking property. In addition, board 118 may have a surface which is dark in color.

Switch 121 is a pressing-type switch. Accordingly, display device 100 also functions as an input device including switch 121.

The plurality of first light sources 122 and 123 and the plurality of second light sources 124 include, on board 118: three first light sources 122 disposed on the X-axis negative side with respect to switch 121; three first light sources 123 disposed on the X-axis positive side with respect to switch 121; and six second light sources 124 disposed between the three first light sources 122 and the three first light sources 123. In addition, first light sources 122 and 123 and second light sources 124 are arranged at separate positions on board 118. The three first light sources 122 are aligned along the Y-axis. The three first light sources 123 are aligned along the Y-axis. The plurality of first light sources 122 and 123 and the plurality of second light sources 124 are each, for example, a light emitting diode (LEI)). It should be noted that each of the plurality of first light sources 122 and 123 and the plurality of second light sources 124 may be a light emitting element other than the LED, such as an organic electro electroluminescence (EL), a light bulb, or the like.

In addition, the plurality of first light sources 122 and 123 and the plurality of second light sources 124 may be light sources of the same type, such as light emitting elements of the same type (LEDs, for example). In this case, the light emitting elements of the same type are light emitting elements which emit light at the same luminance under the same emission conditions (for example, the magnitude of applied current or power).

In this case, the total number of first light sources 122 and 123 and the total number of second light sources 124 are each six. Accordingly, the luminance of first light emitted by first light sources 122 and 123 for displaying first designs 141 to 146 and the luminance of second light emitted by second light sources 124 for displaying second designs 151 to 156 are equal to each other when the emission conditions of first light sources 122 and 123 and second light sources 124 are same.

Control circuit 125 controls operations of first light sources 122 and 123 and second light sources 124.

Figure 8:
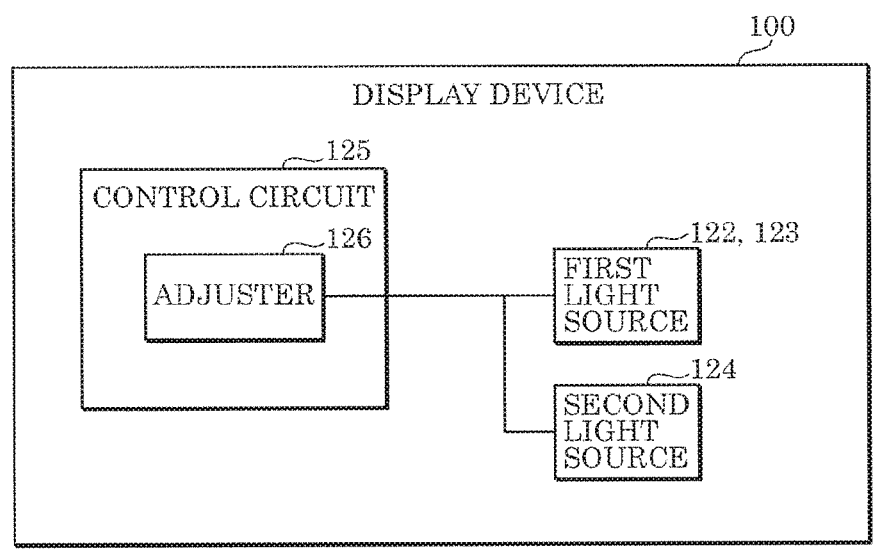
FIG. 8 is a block diagram which illustrates a functional configuration of the display device.

FIG. 8 is a block diagram which illustrates a functional configuration of the display device.

As illustrated in FIG. 8, control circuit 125 includes adjuster 126 which adjusts luminance of first light sources 122 and 123 and second light sources 124.

Adjuster 126 adjusts at least one of the luminance of first light emitted by first light sources 122 and 123 and the luminance of second light emitted by second light sources 124, so as to substantially equalize a first display luminance that is the luminance of light for displaying first designs 141 to 146 and a second display luminance that is the luminance of light for displaying second designs 151 to 156. Adjuster 126 makes the emission conditions different between (i) first light sources 122 and 123 and (ii) second light sources 124, and thereby adjusts the luminance of each of first light sources 122 and 123 and second light sources 124. Adjuster 126 may adjust at least one of the luminance of first light and the luminance of second light by causing feed power to be different between (i) first light sources 122 and 123 and (ii) second light sources 124. Alternatively, adjuster 126 may adjust at least one of the luminance of first light and the luminance of second light by causing feed current to be different between (i) first light sources 122 and 123 and (ii) second light sources 124.

It should be noted that second designs 151 to 156 which are displayed using transmitted light are likely to be brighter than first designs 141 to 146 which are displayed using light guided by light guide body 114. Accordingly, adjuster 126 may adjust the luminance of first light emitted by first light sources 122 and 123 to be higher than the luminance of second light emitted by second light sources 124. In this case, adjuster 126 may make the feed power to first light sources 122 and 123 greater than the feed power to second light sources 124. Alternatively, adjuster 126 may make the feed current to first light sources 122 and 123 greater than the feed current to second light sources 124. Accordingly, adjuster 126 is capable of adjusting the first display luminance of first designs 141 to 146 and the second display luminance of second designs 151 to 156 to be equal to each other.

In addition, adjuster 126 may adjust at least one of the luminance of first light and the luminance of second light by making a duty ratio for emission of first light sources 122 and 123 and a duty ratio for emission of second light sources 124 different from each other. Adjuster 126, for example, may cause second light sources 124 to blink at a duty ratio less than a duty ratio of first light sources 122 and 123. It should be noted that, in this case, the duty ratio of first light sources 122 and 123 includes 1. In other words, the case where first light sources 122 and 123 emit light at all times is included.

In addition, control circuit 125 switches the function of switch 121 to be a function according to one of the positions of first designs 141 to 146 or one of the positions of second designs 151 to 156, which corresponds to a position detected by touch sensor 112. For example, when switch 121 is pressed while touch sensor 112 detects the position corresponding to first design 141, control circuit 125 receives an input of a right cursor key indicated by first design 141. For the other first designs 142 to 146 or second designs 151 to 156, the function is switched, and an input corresponding to the function determined by the switching is received, in the same manner as above.

Control circuit 125 causes display device 100 to operate in a plurality of operation modes. For example, control circuit 125 causes display device 100 to operate in two operation modes, namely, a menu selecting mode as a first operation mode and a music player mode as a second operation mode. Control circuit 125 switches a function when switch 121 is pressed, according to the operation mode determined by a predetermined switching means. Various switching means such as on and off of another switch, audio recognition, gesture recognition, etc., may be included in the examples of the predetermined switching means.

In addition, control circuit 125 associates functions assigned to switch 121 and functions displayed by emission of first light sources 122 and 123 or second light sources 124, according to an operation mode. For example, in the first operation mode, touch sensor 112 and switch 121 are combined to serve as arrow keys for shifting the item that is selected for selecting a menu, and as an enter key for setting the selected item. In addition, in the second operation mode, touch sensor 112 and switch 121 are combined to serve as keys for forwarding or rewinding the number, turning up or down the volume, starting or stopping, etc. of a music player.

According to the present embodiment, control circuit 125 selectively causes either one of (i) first light sources 122 and 123 and (ii) second light sources 124 to emit light, according to an operation mode. In this manner, control circuit 125 controls first light sources 122 and 123 and second light sources 124 such that first designs 141 to 146 are displayed in the first operation mode and second designs 151 to 156 are displayed in the second operation mode. In the same manner, control circuit 125 controls first light sources 122 and 123 and second light sources 124 such that first designs 141 to 146 are displayed on touch sensor 112 in the first operation mode and second designs 151 to 156 are displayed on touch sensor 112 in the second operation mode, by selectively causing first light sources 122 and 123 or second light sources 124 to emit light according to an operation mode.

More specifically, control circuit 125 causes first light sources 122 and 123 to emit light and turns off second light sources 124 in the first operation mode. In the second operation mode, control circuit 125 causes second light sources 124 to emit light and turns off first light sources 122 and 123. In other words, control circuit 125 selectively makes a transition between a first state and a second state according to whether the operation mode is the first operation mode or the second operation mode. In the first state, first light sources 122 and 123 emit light, and second light sources 124 are turned off. In the second state, second light sources 124 emit light and first light sources 122 and 123 are turned off.

It should be noted that control circuit 125 may place all of first light sources 122 and 123 and second light sources 124 in a off state when the combination of touch sensor 112 and switch 122 is placed in an off state by an external switch or the like.

Bottom frames 119 are components which hold board 118 in a state in which bottom frames 119 are fixed to a bottom ends of outer frame 111. More specifically, bottom frames 119 are components which fix board 118 at the bottom ends of outer frame 111.

In this manner, outer frame 111 supports slidably, in the Z-axis direction, pressure portion 116 which supports touch sensor 112, window frame 113, light guide body 114, and mask body 115, and fixes board 118 at the position of bottom ends. Accordingly, when pressure portion 116 slides in the Z-axis direction with respect to outer frame 111, a distance between light guide body 114 and board 118 in the Z-axis direction changes.

Figure 9:
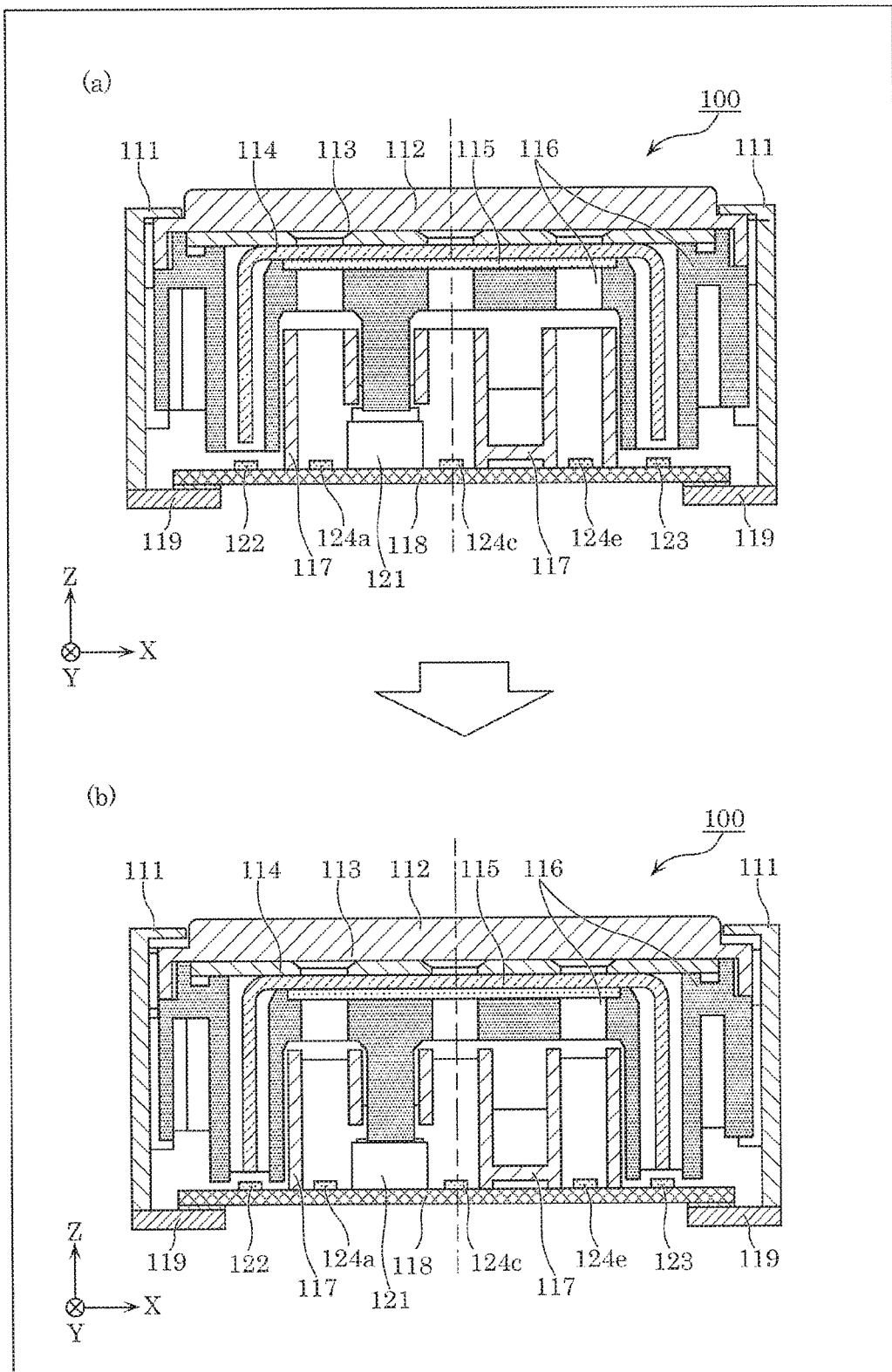
FIG. 9 is a diagram for explaining forward and rearward movement when a switch is pressed.

FIG. 9 is a diagram for explaining forward and rearward movement for pressing switch 121. In FIG. 9, (a) is a cross-sectional view equivalent to FIG. 5 which illustrates a state before switch 121 is pressed. In FIG. 9, (b) is a cross-sectional view which illustrates a state in which switch 121 is pressed.

As illustrated in FIG. 9, when pressure portion 116 which supports touch sensor 112, window frame 113, light guide body 114, and mask body 115 slides toward the Z-axis negative side with respect to outer frame 111, switch 121 is pressed by pressure portion 116.

(1-3. Advantageous Effects, Etc.)

Display device 100 according to the present embodiment includes: first light sources 122 and 123, second light sources 124, light guide body 114, and mask body 115. Light guide body 114 guides first light emitted by first light sources 122 and 123, and reflects the guided first light by reflectors having the shapes of first designs 141 to 146, thereby displaying first designs 141 to 146. Mask body 115 transmits second light emitted by second light sources 124 through light-transmissive portions having the shapes of second designs 151 to 156, and blocks the second light by a light-blocking portion other than the light-transmissive portions. First designs 141 to 146 are displayed at a first display luminance and second designs 151 to 156 are displayed at a second display luminance, and the first display luminance and the second display luminance are substantially equalized by adjusting a luminance of the first light and a luminance of the second light.

More specifically, with display device 100, at least one of the luminance of the first light and the luminance of the second light is adjusted, and thus it is possible to substantially equalize the first display luminance of first designs 141 to 146 and the second display luminance of second designs 151 to 156. Accordingly, it is possible to improve the visual quality of first designs 141 to 146 and second designs 151 to 156 which are displayed using light traveling through paths of light of different types.

In addition, display device 100 according to the present embodiment further includes adjuster 126. Adjuster 126 adjusts at least one of the luminance of the first light and the luminance of the second light to substantially equalize the first display luminance for displaying first designs 141 to 146 and the second display luminance for displaying second designs 151 to 156.

More specifically, adjuster 126 adjusts at least one of the luminance of the first light emitted by first light sources 122 and 123 and the luminance of the second light emitted by second light sources 124, and thus it is possible to substantially equalize the first display luminance of first designs 141 to 146 and the second display luminance of second designs 151 to 156. Accordingly, it is possible to improve the visual quality of first designs 141 to 146 and second designs 151 to 156.

In addition, in display device 100 according to the present embodiment, adjuster 126 adjusts at least one of the luminance of the first light and the luminance of the second light by causing feed power to be different between (i) first light sources 122 and 123 and (ii) second light sources 124. In addition, in display device 100 according to the present embodiment, adjuster 126 adjusts at least one of the luminance of the first light and the luminance of the second light by causing feed current to be different between (i) first light sources 122 and 123 and (ii) second light sources 124. Accordingly, it is possible to easily adjust at least one of the luminance of the first light and the luminance of the second light.

In addition, in display device 100 according to the present embodiment, first light sources 122 and 123 and second light sources 124 comprise light sources of the same type. More specifically, adjuster 126 adjusts feed power or feed current to be fed to first light sources 122 and 123 and second light sources 124 which comprise light sources of the same type, thereby making it possible to easily adjust at least one of the luminance of the first light and the luminance of the second light.

In addition, in display device 100 according to the present embodiment, adjuster 126 adjusts the luminance of the first light to be higher than the luminance of the second light. More specifically, adjuster 126 adjusts the luminance of the first light for displaying first designs 141 to 146 which are displayed using light guide body 114, which is likely to be lower in luminance than the luminance of the second light for displaying second designs 151 to 156 which are displayed using transmitted light, to be higher than the luminance of the second light. Accordingly, adjuster 126 is capable of adjusting the first display luminance of first designs 141 to 146 and the second display luminance of second designs 151 to 156 to be substantially equal to each other. Accordingly, it is possible to improve the visual quality of first designs 141 to 146 and second designs 151 to 156.

In addition, in display device 100 according to the present embodiment, adjuster 126 causes second light sources 124 to blink at a duty ratio less than a duty ratio of first light sources 122 and 123. Accordingly, it is possible to easily adjust the luminance of the first light to be higher than the luminance of the second light.

In addition, display device 100 according to the present embodiment further includes separator wall 117. Separator wall 117 separates between (i) first light sources 122 and 123 and (ii) second light sources 124. In addition, separator wall 117 includes a wall surface having one of a dark portion, a matte portion, and a diffused reflection portion, on a side facing second light sources 124. With this configuration, separator wall 117 is capable of reducing reflectance of the second light, and thus it is possible to make the luminance of the second light to be lower than the luminance of the first light. Accordingly, it is possible to easily adjust the luminance of the first light to be higher than the luminance of the second light.

In addition, in display device 100 according to the present embodiment, first designs 141 to 146 and second designs 151 to 156 are displayed at overlapping positions. In the case where first designs 141 to 146 and second designs 151 to 156 are disposed at overlapping positions, a difference between a luminance of first designs 141 to 146 and a luminance of second designs 151 to 156 is likely to be particularly distinct when first designs 141 to 146 and second designs 151 to 156 are displayed at different luminance. However, even when first designs 141 to 146 and second designs 151 to 156 are disposed at such positions where a difference is likely to be distinct, it is possible to adjust the luminance for displaying first designs 141 to 146 and the luminance for displaying second designs 151 to 156 to be substantially equalized. Accordingly, it is possible to improve the visual quality of first designs 141 to 146 and second designs 151 to 156.

In addition, in display device 100 according to the present embodiment, only one of (i) first light sources 122 and 123 and (ii) second light sources 124 are selected and caused to emit light. Accordingly, even when either one of (i) first designs 141 to 146 and (ii) second designs 151 to 156 are selected and displayed, the luminance for displaying first designs 141 to 146 and the luminance for displaying second designs 151 to 156 are adjusted to be substantially equalized. Thus, the luminance for displaying first designs 141 to 146 and the luminance for displaying second designs 151 to 166 are substantially equalized even when the display is switched. Accordingly, it is possible to improve visual quality of first designs 141 to 146 and second designs 151 to 156.

(1-4. Variation of Embodiment 1)

In the foregoing Embodiment 1, adjuster 126 adjusts the first display luminance for displaying first designs 141 to 146 and the second display luminance for displaying second designs 151 to 156 to be substantially equalized, by causing feed power, feed current, or a duty ratio to be different between (i) first light sources 122 and 123 and (ii) second light sources 124. However, the present disclosure is not limited to this example. The following describes variation examples in the case where adjuster 126 is not used for adjusting luminance.

(1-4-1. Variation 1 of Embodiment 1)

Figure 10:
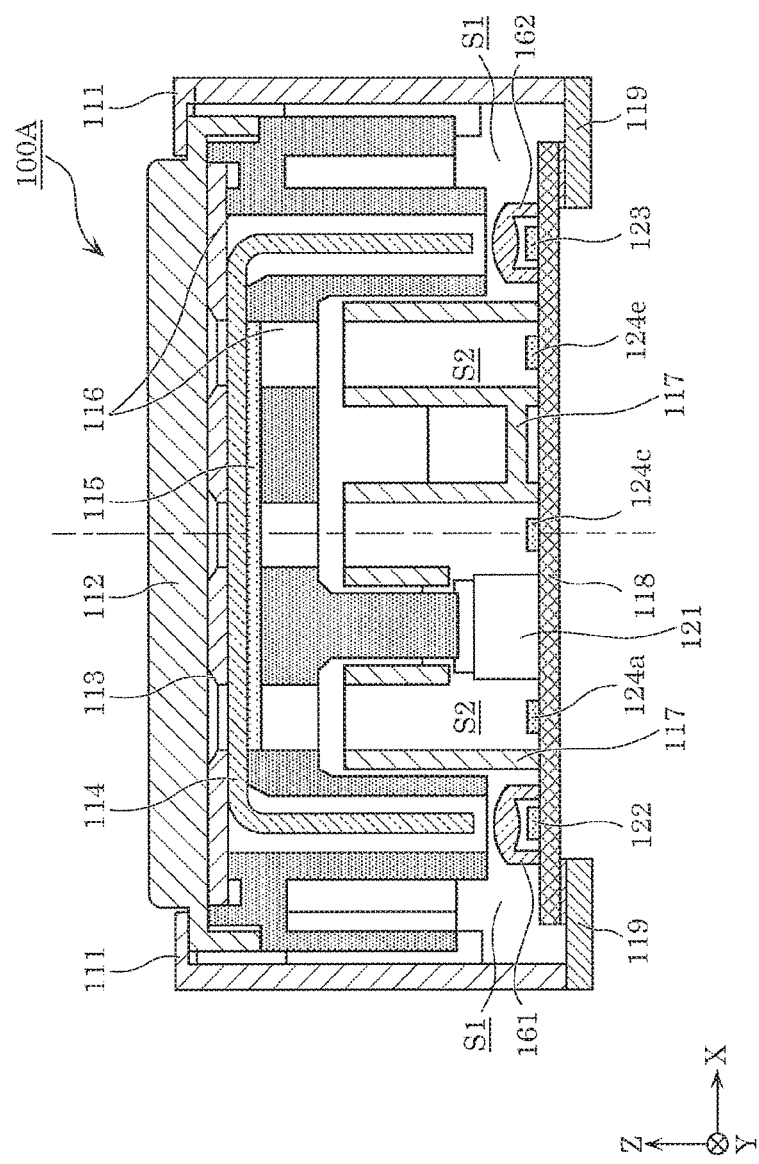
FIG. 10 is a cross-sectional view of a display device according to Variation 1 of Embodiment 1, which corresponds to the cross-sectional view taken along V-V in FIG. 3.

The following describes a configuration of display device 100A of Variation 1, with reference to FIG. 10.

FIG. 10 is a cross-sectional view of a display device according to Variation 1 of Embodiment 1, which corresponds to the cross-sectional view taken along V-V in FIG. 3.

For example, display device 100A illustrated in FIG. 10 includes, as adjusters, lenses 161 and 162 which are disposed above first light sources 122 and 123, respectively, on a side to which the first light is emitted, and collect the first light. In other words, the adjuster may include lenses 161 and 162 which adjust luminance of the first light. In this case, a lens need not be disposed above second light source 124. It should be noted that, since the configuration other than lenses 161 and 162 is equivalent to the configuration described in Embodiment 1, description for the equivalent configuration shall be omitted.

Lenses 161 and 162 are, for example, convex lenses, Fresnel lenses, etc., formed using a transparent material such as resin, glass, etc.

With display device 100A according to Variation 1 of Embodiment 1, it is possible to collect light emitted by first light sources 122 and 123, by disposing lenses 161 and 162 above first light sources 122 and 123 on the side to which the first light is emitted. Accordingly, it is possible to adjust the luminance of the first light to be higher than the luminance of the second light.

It should be noted that, although the luminance of the first light is adjusted using lenses 161 and 162 without adjusting the luminance using adjuster 126 of Embodiment 1, in display device 100A according to Variation 1 of Embodiment 1, adjuster 126 of Embodiment 1 and lenses 161 and 162 may be combined to adjust the luminance.

In addition, although lenses 161 and 162 are disposed above first light sources 122 and 123 on the side to which the first light is emitted in display device 100A according to Variation 1 of Embodiment 1, lenses may be disposed above second light sources 124 on the side to which the second light is emitted, without disposing lenses 161 and 162 above first light sources 122 and 123.

In addition, first lenses which collect the first light and second lenses which collect the second light may be disposed above first light sources 122 and 123 on the side to which the first light is emitted and above second light sources 124 on the side to which the second light is emitted, respectively. In this case, the first lenses and the second lenses are mutually different in the degree of collecting light, namely, a focal length.

In this manner, according to Variation 1 of Embodiment 1, lenses which collect light are disposed above at least one of (i) the first light sources on the side to which the first light is emitted and (ii) the second light sources on the side to which the second light is emitted, and thereby luminance of light on the side where the lenses are disposed is adjusted.

(1-4-2. Variation 2 of Embodiment 1)

Figure 11:
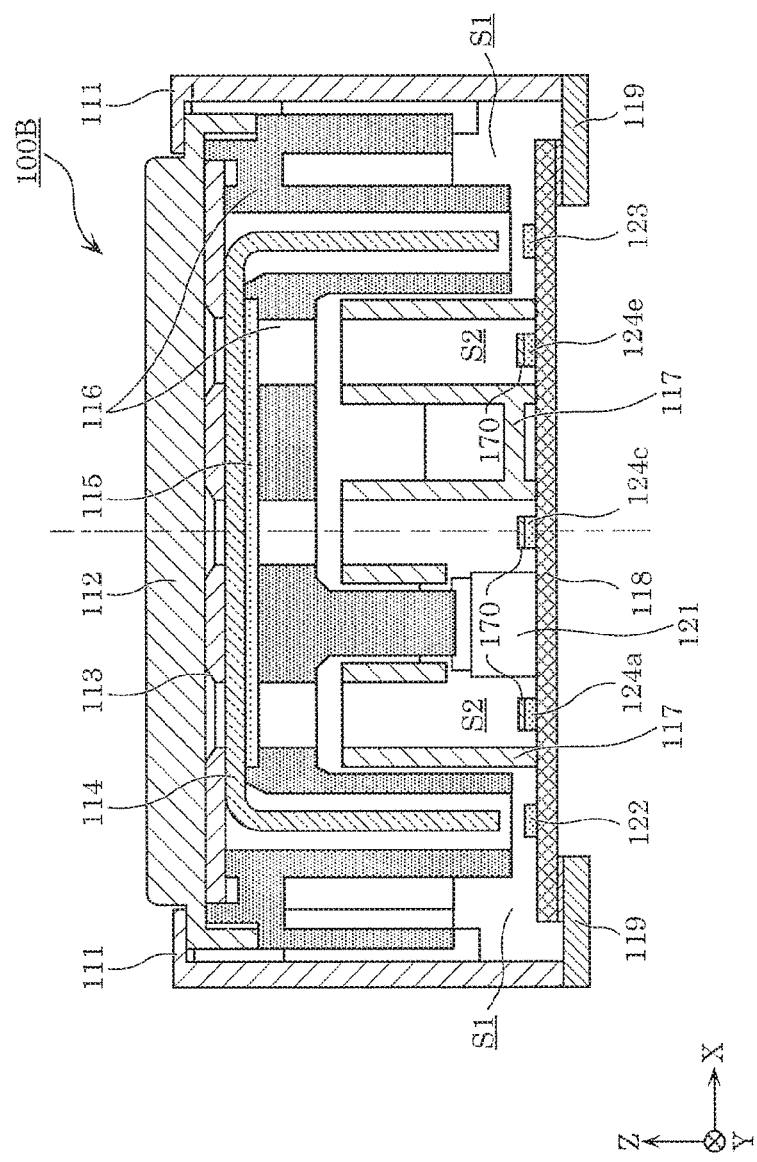
FIG. 11 is a cross-sectional view of a display device according to Variation 2 of Embodiment 1, which corresponds to the cross-sectional view taken along V-V in FIG. 3.

The following describes a configuration of display device 100B of Variation 2 of Embodiment 1, with reference to FIG. 11.

FIG. 11 is a cross-sectional view of a display device according to Variation 2 of Embodiment 1, which corresponds to the cross-sectional view taken along V-V in FIG. 3.

For example, display device 100B illustrated in FIG. 11 includes, as adjusters, light reducers 170 which are disposed above second light sources 124 on the side to which the second light is emitted, and reduce an amount of the second light. In other words, the adjuster may include light reducers 170 which adjust luminance of the second light. In this case, the light reducers need not be disposed above first light sources 122 and 123. It should be noted that, since the configuration other than light reducers 170 is equivalent to the configuration described in Embodiment 1, description for the equivalent configuration shall be omitted.

Light reducers 170 include a material (material that is colored with smoke as a whole) which transmits light by a predetermined amount. More specifically, light reducers 170 include a transparent material in which fine particles for absorbing light are dispersed. Light reducers 170 are, for example, neutral density (ND) filters.

With display device 100B according to Variation 2 of Embodiment 1, it is possible to reduce light emitted by second light sources 124, by disposing light reducers 170 above second light sources 124 on the side to which the second light is emitted. Accordingly, it is possible to adjust the luminance of the first light to be higher than the luminance of the second light.

In addition, instead of light reducers 170, light diffusers which diffuse light may be disposed above second light sources 124 on the side to which the second light is emitted. In other words, the adjuster may include the light diffusers which adjust luminance of the second light.

The light diffusers may be formed using a transparent material in which fine particles for diffusing (diffusely reflecting) light are dispersed, or lenses which diffuse light, namely, concave lenses.

In this case as well, it is possible to diffuse light emitted by second light sources 124, by disposing the light diffusers above second light sources 124 on the side to which the second light is emitted. Accordingly, it is possible to adjust the luminance of the first light to be higher than the luminance of the second light.

It should be noted that, although the luminance of the second light is adjusted using light reducers 170 or the light diffusers without adjusting the luminance using adjuster 126 of Embodiment 1, in display device 100B according to Variation 2 of Embodiment 1, adjuster 126 of Embodiment 1 and light reducers 170 or the light diffusers may be combined to adjust the luminance.

In addition, although light reducers 170 or the light diffusers are disposed above second light sources 124 on the side to which the second light is emitted in display device 100B according to Variation 2 of Embodiment 1, light reducers 170 for reducing the first light or the light diffusers for diffusing the fast light may be disposed above first light sources 122 and 123 on the side to which the first light is emitted without disposing light reducers 170 or the light diffusers above second light sources 124.

In addition, first light reducers which reduce the first light or first light diffusers which diffuse the first light may be disposed above first light sources 122 and 123 on the side to which the first light is emitted, and second light reducers which reduce the second light or second light diffusers which diffuse the second light may further be disposed above second light sources 124 on the side to which the second light is emitted. In this case, the first light reducers and the second light reducers are materials mutually different in the degree of reducing light. For example, a density of fine particles which absorb light per unit area is different between the first light reducers and the second light reducers. In addition, in this case, the first light diffusers and the second light diffusers are materials mutually different in the degree of diffusing light due to a difference in density of fine particles which diffuse light per unit area, for example. Alternatively, the first light diffusers and the second light diffusers are concave lenses mutually different in the focal length. It should be noted that the unit area described above is obtained, for example, based on an area of each of the light reducers or each of the light diffusers when the light reducer or the light diffuser is viewed from an optical axis of each of the light sources in a plan view.

In this manner, according to Variation 2 of Embodiment 1, the light reducers or the light diffusers are disposed above at least one of (i) the first light sources on the side to which the first light is emitted and (ii) the second light sources on the side to which the second light is emitted, and thereby at least one of the first light and the luminance of the second light is adjusted.

(1-4-3. Variation 3 of Embodiment 1)

Figure 12:
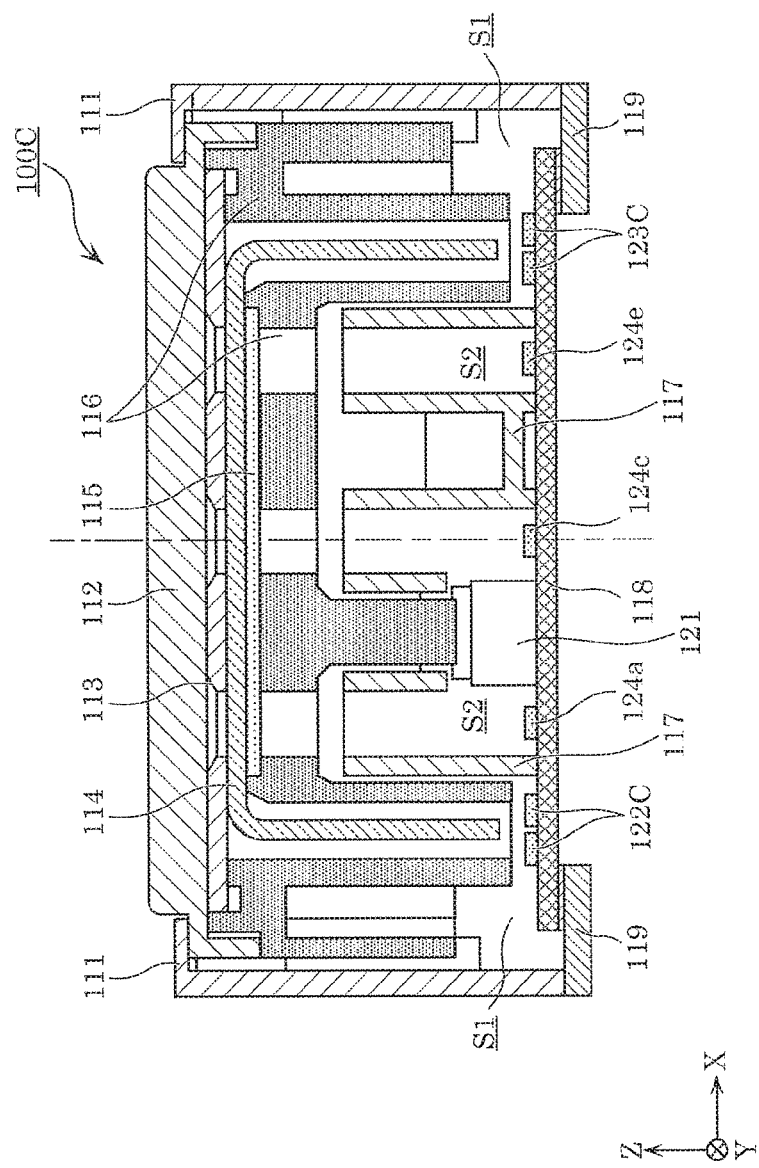
FIG. 12 is a cross-sectional view of a display device according to Variation 3 of Embodiment 1, which corresponds to the cross-sectional view taken along V-V in FIG. 3.

The following describes a configuration of display device 100C of Variation 3 of Embodiment 1, with reference to FIG. 12.

FIG. 12 is a cross-sectional view of a display device according to Variation 3 of Embodiment 1, which corresponds to the cross-sectional view taken along V-V in FIG. 3.

For example, display device 100C illustrated in FIG. 12 includes twice as many first light sources 122C and 123C as first light sources 122 and 123 of display device 100 according to Embodiment 1. In other words, although not entirely illustrated, first light sources 122C and 123C include twelve light emitting elements (LEDs). Meanwhile, second light sources 124 are equivalent to second light sources 124 included in display device 100 of Embodiment 1, and thus include six light emitting elements (LEDs). In other words, second light sources 124 include light emitting elements different in total number from the light emitting elements included in first light sources 122C and 123C. In display device 100C according to Variation 3, the total number of light emitting elements included in first light sources 122C and 123C is greater than the total number of light emitting elements included in second light sources 124.

In this manner, with display device 100C according to Variation 3 of Embodiment 1, it is possible to adjust at least one of the luminance of the first light and the luminance of the second light, by causing the total number of light emitting elements included to differ between (i) first light sources 122C and 123C and (ii) second light sources 124.

It should be noted that at least one of the luminance of the first light and the luminance of the second light may be adjusted by making the total number of light emitting elements included in the second light sources greater than the total number of light emitting elements included in the first light sources.

Alternatively, not limited to adjusting luminance by varying the total number of light emitting elements, at least one of the luminance of the first light and the luminance of the second light may be adjusted by employing light emitting elements having maximum luminance different between the first light sources and the second light sources. More specifically, even under the same emission conditions, light emitting elements which are employed emit light at different luminance when, for example, the light emitting elements differ in luminescence efficiency. Accordingly, utilizing this, light emitting elements which are different in performance such as luminescence efficiency, maximum luminance, or the like may be respectively employed for the first light sources and the second light sources.

(1-4-4. Variation 1 of Embodiment 4)

Figure 13:
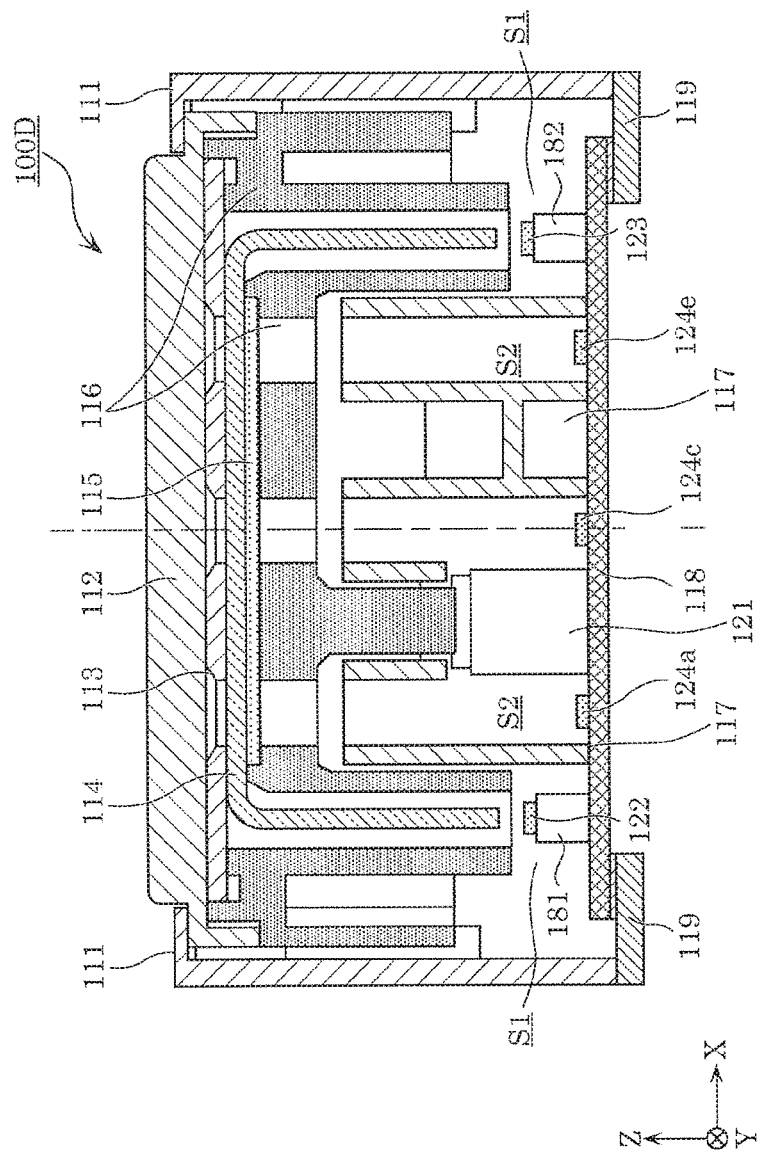
FIG. 13 is a cross-sectional view of a display device according to Variation 4 of Embodiment 1, which corresponds to the cross-sectional view taken along V-V in FIG. 3.

The following describes a configuration of display device 100D of Variation 4 of Embodiment 1, with reference to FIG. 13.

FIG. 13 is a cross-sectional view of a display device according to Variation 4 of Embodiment 1, which corresponds to the cross-sectional view taken along V-V in FIG. 3.

For example, first light sources 122 and 123 included in display device 100I) illustrated in FIG. 13 are located at higher positions from board 118 than first light sources 122 and 123 included in display device 100 according to Embodiment 1. More specifically, first light sources 122 and 123 are disposed on bases 181 and 182, respectively, which are disposed on board 118. With this configuration, the height from board 118 of each of the positions at which first light sources 122 and 123 are disposed are greater than the height from board 118 of each of the positions at which second light sources 124 are disposed. In this manner, by disposing first light sources 122 and 123 at higher positions from board 118, than positions at which second light sources 124 are disposed, it is possible to place first light sources 122 and 123 to be closer to a display screen on which first designs 141 to 146 and second designs 151 to 156 are displayed than second light sources 124. Accordingly, it is possible to adjust the luminance of the first light which is effective to display first designs 141 to 146, by adjusting the heights of bases 181 and 182. In this manner, it is possible to adjust the first display luminance and the second display luminance to be substantially equalized.

It should be noted that, although a configuration example in which the first light sources are disposed above the board via the bases and the second light sources are directly disposed on the board has been described with reference to FIG. 13, the configuration is not limited to this example. The first light sources may be directly mounted on the board, and the second light sources may be disposed above the board via the bases. In other words, it is sufficient that the first light sources and the second light sources are disposed at different heights from the board.

In addition, the present disclosure is not limited to the configuration in which a height is changed using the bases. It is sufficient that the present disclosure has a configuration in which a distance between the display screen and each of the light sources is changed. The distance between the display screen and each of the light sources may be changed by changing the shape of the board as a result of providing a recess and protrusion, for example.

(1-4-5. Variation 5 of Embodiment 1)

Next, Variation 5 of Embodiment 1 will be described.

Instead of the configuration in which at least one of the luminance of the first light and the luminance of the second light is adjusted in display devices 100 and 100A to 100D according to embodiment 1 and Variations 1 to 4 of Embodiment 1 described above, at least one of the luminance of the first light and luminance of the second light may be adjusted by including one of a dark portion, a matte portion, and a diffused reflection portion, on a wall surface of separator wall 117 on a side facing second light source 124. In other words, the wall surface of separator wall 117 on the side facing second light source 124 may include a material which is dark in color, a material which is matte, or a material which diffusely reflects light. In this case, it is assumed that wall surfaces of separator wall 117 on the side facing first light sources 122 and 123 are not provided with a dark portion, a matte portion, or a diffused reflection portion. Here, being dark in color means having a color such as black, navy, brown, or the like, which is a color with reflectance lower than predetermined reflectance.

With this configuration, a portion of the second light is absorbed or diffusely reflected by the wall surface of separator wall 117 on the side facing second light sources 124, and thus it is possible to reduce the reflectance of the second light. Accordingly, it is possible to easily adjust the luminance of the second light that is effective for displaying second designs 151 to 156 to be lower than the luminance of the first light.

It should be noted that, in contrast to the above, separator wall 117 may include a wall surface having a dark portion, a matte portion, or a diffused reflection portion on the side facing first light sources 122 and 123. In this case as well, it is assumed that wall surfaces of separator wall 117 on the side facing second light sources 124 are not provided with a dark portion, a matte portion, or a diffused reflection portion.

Embodiment 2

Next, Embodiment 2 will be described below.

[2-1. Configuration]

Display device 100E according to Embodiment 2 is different in a connecting portion between separator wall 117 and board 118 from display device 100 according to Embodiment 1 described above.

Figure 14:
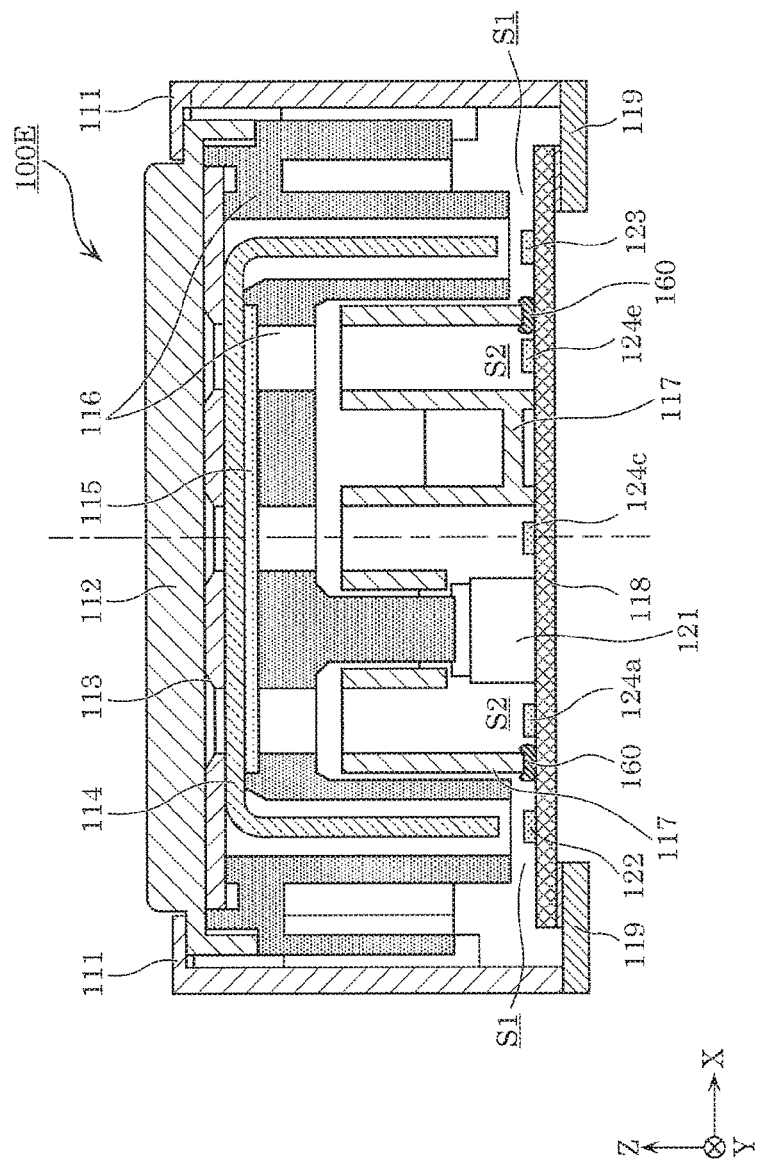
FIG. 14 is a cross-sectional view of a display device according to Embodiment 2, which corresponds to the cross-sectional view taken along V-V in FIG. 3.

Board 118 and separator wall 117 are connected in a state in which light is blocked between first space S1 and second space S2. More specifically, board 118 and separator wall 117 are connected by filling filler 160 having a light-blocking property in a space between board 118 and separator wall 117 as illustrated in FIG. 14. Filler 160 may have a surface which is dark in color. Here, being dark in color means having a color such as black, navy, brown, or the like, which is a color with reflectance lower than predetermined reflectance. Filler 160 is formed using, for example, a rubber, an adhesive, or the like.

(2-2. Advantageous Effects, Etc.)

Display device 100E according to the present embodiment includes: first light sources 122 and 123, second light sources 124, light guide body 114, mask body 115, board 118, and separator wall 117. Either (i) first light sources 122 and 123 or (ii) second light sources 124 is selectively turned on. Light guide body 114 guides first light emitted by first light sources 122 and 123, and reflects the guided first light by reflectors having the shapes of first designs 141 to 146, thereby displaying designs 141 to 146. Mask body 115 transmits second light emitted by second light sources 124, by light-transmissive portions having the shapes of second designs 151 to 156, and blocks the second light by a light-blocking portion other than the light-transmissive portions. First light sources 122 and 123 and second light sources 124 are disposed on board 118. Separator wall 117 separates between (i) first light sources 122 and 123 and (ii) second light sources 124, and has a light-blocking property. Board 118 and separator wall 117 are connected in a state in which light is blocked between first space S1 in which first light sources 122 and 123 are disposed and second space S2 in which second light sources 124 are disposed.

Accordingly, when first light sources 122 and 123 emit light, it is possible to reduce leakage of first light emitted by first light sources 122 and 123, into second space S2 from the connecting portion between board 118 and separator wall 117. In the same manner, when second light sources 124 emit light, it is possible to reduce leakage of second light emitted by second light sources 124, into first space S1 from the connecting portion between board 118 and separator wall 117. It is thus possible to reduce second designs 151 to 156 being accidentally reflected while first designs 141 to 146 are displayed, and to reduce first designs 141 to 146 being accidentally reflected while second designs 151 to 156 are displayed. In this manner, with display device 100E, it is possible to selectively and independently display first designs 141 to 146 and second designs 151 to 156, and thus the visual quality can be improved.

In addition, in display device 100E according to the present embodiment, board 118 and separator wall 117 are connected by filling filler 160 that has a light-blocking property, in a space between board 118 and separator wall 117. Accordingly, it is possible to effectively block light between first space S1 and second space S2 in the connecting portion between board 118 and separator wall 117.

In addition, in display device 100E according to the present embodiment, filler 160 has a surface which is dark in color. Accordingly, it is possible to reduce the first light emitted by first light sources 122 and 123 or second light emitted by second light sources 124 being reflected by filler 160. Accordingly, it is possible to reduce light being diffusely reflected by filler 160, making it possible to effectively block light between first space S1 and second space S2.

In addition, in display device 100E according to the present embodiment, filler 160 is a rubber or an adhesive. Accordingly, it is possible to easily fill a gap in the connecting portion between board 118 and separator wall 117. Accordingly, it is possible to effectively block light between first space S1 and second space S2 in the connecting portion between board 118 and separator wall 117.

In addition, in display device 100E according to the present embodiment, board 118 includes a material having a light-blocking property. Accordingly, it is possible to prevent leakage of light from board 118, and thus to block light between first space S1 and second space S2. In addition, since board 118 has a light-blocking property, it is possible to reduce the possibility of light propagating inside the board from one space to the other space, as in a general glass epoxy board, and dimly illuminating the other space.

In addition, in display device 100E according to the present embodiment, separator wall 117 has a surface which is dark in color. Accordingly, it is possible to reduce light being diffusely reflected by the surface of separator wall 117, making it possible to effectively block light between first space S1 and second space S2.

In addition, in display device 100E according to the present embodiment, board 118 has a surface which is dark in color. Accordingly, it is possible to reduce light being diffusely reflected by the surface of board 118, making it possible to effectively block light between first space S1 and second space S2.

(2-3. Variation of Embodiment 2)

(2-3-1. Variation 1 of Embodiment 2)

Figure 15:
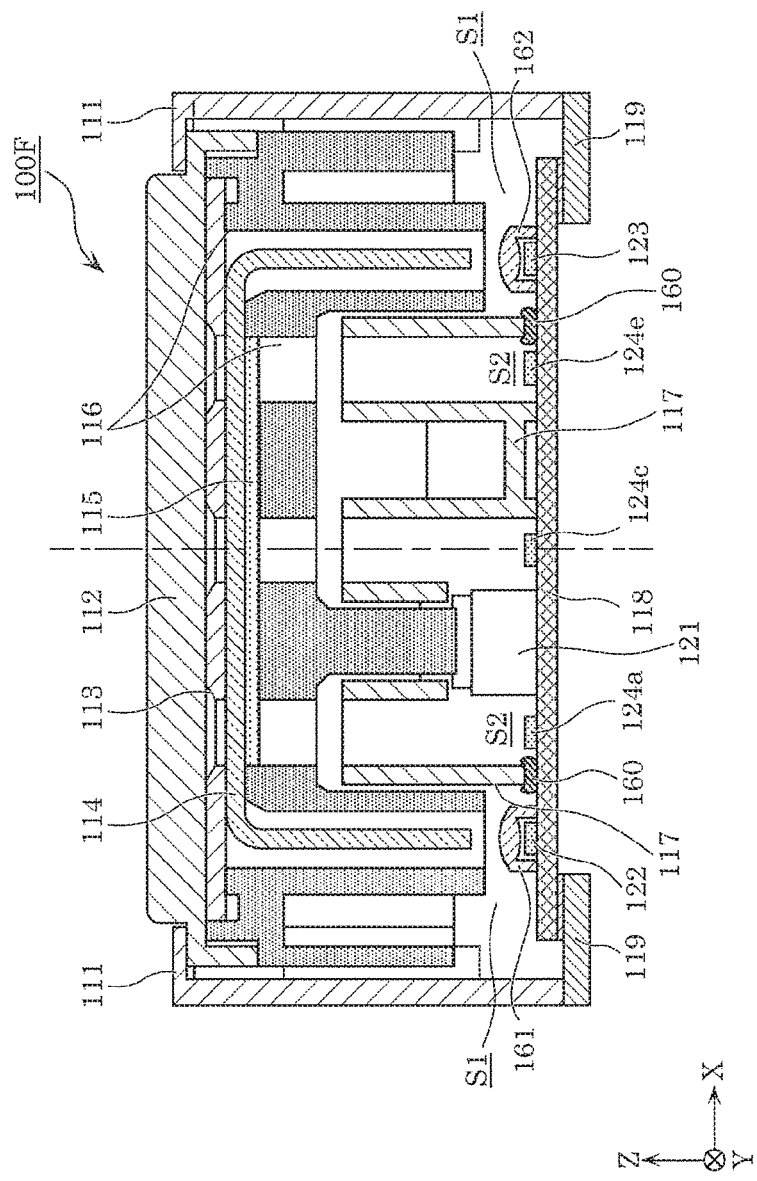
FIG. 15 is a cross-sectional view of a display device according to Variation 1 of Embodiment 2, which corresponds to the cross-sectional view taken along V-V in FIG. 3.

The following describes a configuration of display device 100F according to Variation 1 of Embodiment 2, with reference to FIG. 15.

FIG. 15 is a cross-sectional view of a display device according to Variation 1 of Embodiment 2, which corresponds to the cross-sectional view taken along V-V in FIG. 3.

For example, display device 100F illustrated in FIG. 15 further includes lenses 161 and 162 which are disposed above first light sources 122 and 123, respectively, on a side to which the first light is emitted, and collect the first light, in addition to the configuration of display device 100 according to Embodiment 1. In this case, lenses need not be disposed above second light sources 124 as illustrated in FIG. 15, or lenses equivalent to lenses 161 and 162 may be disposed. It should be noted that, since the configuration other than lenses 161 and 162 is equivalent to the configuration described in Embodiment 1, description for the equivalent configuration shall be omitted.

Lenses 161 and 162 are, for example, convex lenses, Fresnel lenses, etc., formed using a transparent material such as resin, glass, etc.

In addition, although lenses 161 and 162 are disposed above first light sources 122 and 123 on the side to which the first light is emitted, lenses for collecting the second light may be disposed above second light sources 124 on the side to which the second light is emitted, without disposing lenses 161 and 162 above first light sources 122 and 123.

In this manner, lenses for collecting light are disposed above at least one of (i) first light sources 122 and 123 and (ii) second light sources 124 on the side to which light is emitted, and thus it is possible, by the lenses, to collect light emitted by at least one of (i) first light sources 122 and 123 and (ii) second light sources 124. Accordingly, it is possible to reduce the first light of first light sources 122 and 123 traveling toward second space S2, or to reduce the second light of second light sources 124 traveling toward first space S1. Accordingly, it is possible to effectively block light between first space S1 and second space S2 in the connecting portion between board 118 and separator wall 117.

(2-3-2. Variation 2 of Embodiment 2)

In Embodiment 2 and Variation 1 of Embodiment 2 described above, board 118 and separator wall 117 are connected by filling a space between board 118 and separator wall 117 with filler 160 that has a light-blocking property. However, the present disclosure is not limited to this example.

Figure 16:
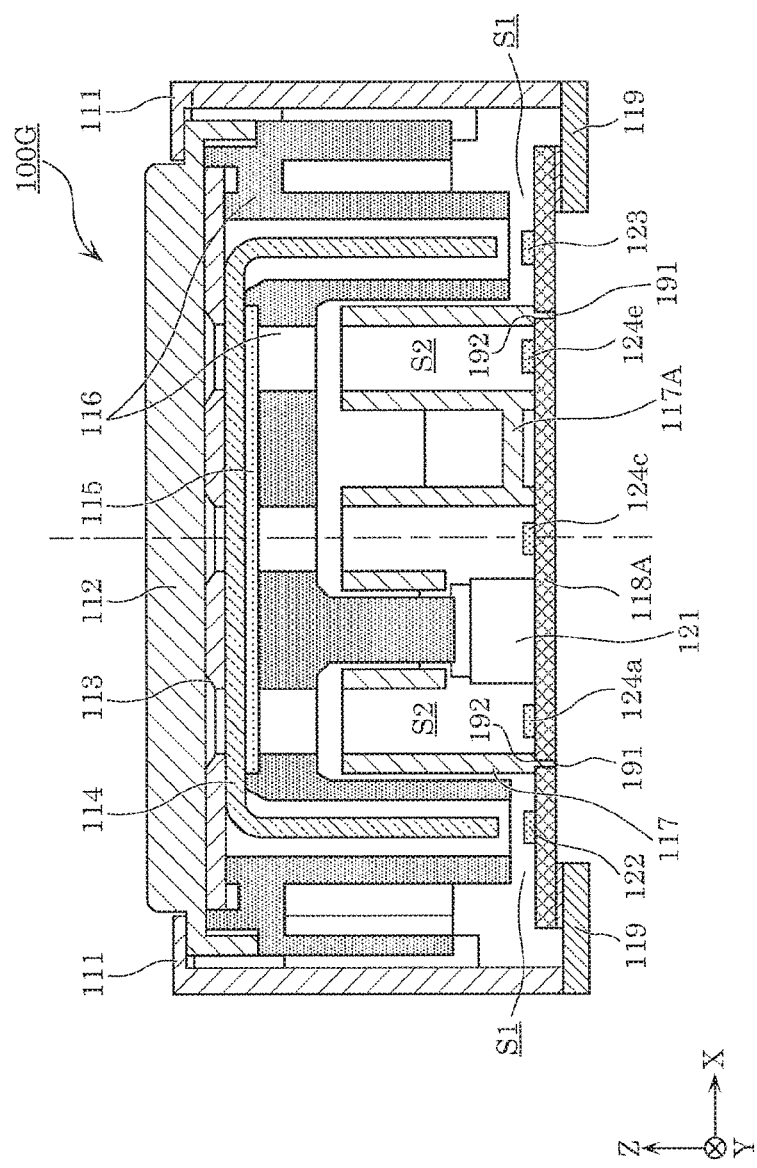
FIG. 16 is a cross-sectional view of a display device according to Variation 2 of Embodiment 2, which corresponds to the cross-sectional view taken along V-V in FIG. 3.

The following describes a configuration of display device 100G of Variation 2 of Embodiment 2, with reference to FIG. 16.

FIG. 16 is a cross-sectional view of a display device according to Variation 2 of Embodiment 2, which corresponds to the cross-sectional view taken along V-V in FIG. 3.

Display device 100F according to Variation 2 of Embodiment 2 is different in configurations of separator wall 117A and board 118A from display device 100 according to Embodiment 1. Accordingly, the following describes the configurations of separator wall 117A and board 118A. It should be noted that the configuration of display device 100F according to Variation 2 of Embodiment 2 other than separator wall 117A and board 118A is equivalent to the configuration of display device 100 of Embodiment 1, and thus detailed description for the equivalent configuration will be omitted.

Separator wall 117A includes penetrating portion 191 having a tip which penetrates through board 118A at a connecting portion between separator wall 117A and board 118A.

Board 118A includes through-hole 192 which penetrating portion 191 of separator wall 117A penetrates through.

In this manner, board 118A and separator wall 117A are connected by inserting penetrating portion 191 of separator wall 117A into through-hole 192 in board 118A. Accordingly, separator wall 117A is capable of easily separating first space S1 from second space S2 while a gap at the connecting portion being reduced to the minimum. In addition, board 118A includes through-hole 192, and thus even when light propagates inside board 118A, the propagation of the light is blocked by through-hole 192. Accordingly, it is possible to effectively block light between first space S1 and second space S2 in the connecting portion between board 118A and separator wall 117A.

It should be noted that, although the foregoing describes the case where penetrating portion 191 of separator wall 117A penetrates through through-hole 192 of board 118A, separator wall 117A may be configured to not penetrate through board 118A. More specifically, the separator wall may be inserted into a recess portion such as a groove formed on the board, at the connecting portion between the separator wall and the board, without penetrating through the board. In other words, the separator wall may be configured to fit in the board. In this case as well, it is possible to yield the advantageous effect equivalent to the advantageous effect yielded by board 118A and separator wall 117A of Variation 1 of Embodiment 2.

(2-3-3. Variation 3 of Embodiment 2)

Although Embodiment 2 and Variations 1 and 2 of Embodiment 2 describe the case where outer frame 111 supports slidably, in the Z-axis direction, pressure portion 116 which supports touch sensor 112, window frame 113, light guide body 114, and mask body 115, and fixes board 118 at the position of bottom ends, the present disclosure is not limited to this case, and may have a configuration in which outer frame 111 is fixed to touch sensor 112, window frame 113, light guide body 114, mask body 115, and pressure portion 116. In this case, switch 121 may be provided to another board disposed on the Z-axis negative side with respect to board 118, instead of being provided to board 118. More specifically, with the display device in this case, the display device slides toward the Z-axis negative side via another supporter when pressed toward the Z-axis negative side, and thereby presses the switch provided to another board.

(2-3-4. Variation 4 of Embodiment 2)

Although Embodiment 2 and Variations 1 and 2 of Embodiment 2 describe the case where relative positions of board 118 or 118A and separator wall 117 or 117A are fixed, the separator wall, together with touch sensor 112, window frame 113, light guide body 114, mask body 115, and pressure portion 116 may move in a direction toward the board when touch sensor 112 is pressed. In this case, the separator wall may move relative to the board, while keeping a state in which light is blocked at the connecting portion between the board and the separator wall.

For example, when a filler is provided between the separator wall and the board, the separator wall and the board may be connected via the filler such that the filler is compressed when the separator wall moves in the direction toward the board, thereby tolerating the movement of the separator wall. In addition, for example, when the end portion of the separator wall is inserted into the recess portion or the through-hole of the board, the separator wall may be connected to the board slidably in the direction of insertion in a state in which the end portion of the separator wall is inserted into the recess portion or the through-hole of the board 3. Others Although the forgoing has described that, in display devices 100, and 100A to 100G according to Embodiments 1 and 2, Variations 1 to 5 of Embodiment 1, and Variations 1 to 4 of Embodiment 2, the outer shape of the opening included in window frame 113 is quadrilateral, the outer shape of the opening is not limited to this example. Example of the outer shape of the opening may include a circle, a star, and other various shapes. In addition, the outer shape of the opening of pressure portion 116 and the shape of the wall of separator wall 117 are also not limited to be quadrilateral, and may be any shape according to the outer shape of the opening included in window frame 113. With this configuration, in the regions in proximity to the reflectors having the shapes of first designs 141 to 146 and the light-transmissive portions having the shapes of second designs 151 to 156, it is possible to display first designs 141 to 146 and second designs 151 to 156 in various shapes according to the shapes of the opening of window frame 113, the opening of pressure portion 116, and the wall of separator wall 117.

It should be noted that the forgoing describes that display device 100 includes switch 121, the present disclosure in not limited to this example. For example, without including switch 121, only the function of switching light sources to selectively display first designs 141 to 146 and second designs 151 to 156 may be included.

Although the foregoing describes the case where first light sources 122 and 123 and second light sources 124 each comprise a plurality of light emitting elements, in display devices 100, and 100A to 100G according to the foregoing Embodiments 1 and 2, Variations 1 to 5 of Embodiment 1, and Variations 1 to 4 of Embodiment 2, the present disclosure is not limited to this, and first light sources 122 and 123 and second light sources 124 may each comprise a single light emitting element.

At least one of the luminance of the first light and the luminance of the second light is adjusted in display devices 100, and 100A to 100D according to the foregoing Embodiment 1 and Variations 1 to 5 of Embodiment 1. However, in display devices 100E to 100G according to Embodiment 2 and Variations 1 to 4 of Embodiment 2, the luminance of the first light and the luminance of the second light may be adjusted in the same manner as Embodiment 1, or may be not adjusted unlike Embodiment 1.

Although the display device and the input device according to one or more aspects of the present disclosure have been described above based on the embodiments, the present disclosure is not limited to the above-described embodiments. Other forms in which various modifications apparent to those skilled in the art are applied to the embodiments, or forms structured by combining structural components of different embodiments may be included within the scope of one or more aspects of the present disclosure, unless such changes and modifications depart from the scope of the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by references on their entirety: Japanese Patent Application No. 2018-022174 filed on Feb. 9, 2018, Japanese Patent Application No. 2018-027976 filed on Feb. 20, 2018, and Japanese Patent Application No. 2018-170042 filed on Sep. 11, 2018.

INDUSTRIAL APPLICABILITY

The present disclosure is applicable to a display device, an input device, etc. capable of improving the visual quality of the first design and the second design which are displayed using light traveling through paths of light of different types.

What is claimed is:
1. A display device, comprising:
  a first light source;
  a second light source;
  a light guide body which includes a reflector having a shape of a first design, guides first light emitted by the first light source, and reflects the first light by the reflector to display the first design; and
  a mask body which includes a light-transmissive portion having a shape of a second design and a light-blocking portion that is a portion other than the light-transmissive portion, the light-transmissive portion transmitting second light emitted by the second light source to display the second design, the light-blocking portion blocking the second light, and
  at least one of
    (i) a convex lens which is disposed above the first light source on a side to which the first light is emitted, collects the first light, and emits collected first light to the light guide body,
    (ii) a light reducer which is disposed above the second light source on a side to which the second light is emitted, reduces a light amount of the second light and emits reduced second light to the mask body, or
    (iii) a light diffuser which is disposed above the second light source on a side to which the second light is emitted, diffuses the second light and emits diffused second light to the mask body, wherein
  the first design is displayed at a first display luminance and the second design is displayed at a second display luminance, and
  the first display luminance and the second display luminance are substantially equalized by at least one of (i) the convex lens, (ii) the light reducer, or (iii) the light diffuser adjusting a luminance of the first light to be higher than a luminance of the second light without electrical adjustment of luminance.

2. The display device according to claim 1, wherein the first light source includes one or more first light emitting elements and the second light source includes one or more second light emitting elements, the one or more first light emitting elements of the first light source being different in number from the one or more second light emitting elements of the second light source.

3. The display device according to claim 1, further comprising:
  a board on which the first light source and the second light source are disposed, wherein
  the first light source and the second light source are disposed at different heights from the board.

4. The display device according to claim 1, wherein the first design and the second design are displayed at overlapping positions.

5. The display device according to claim 1, wherein only one of the first light source and the second light source is turned on at a time.

6. The display device according to claim 1, further comprising:
  a board on which the first light source and the second light source are disposed; and
  a separator wall which separates the first light source and the second light source, and has a light-blocking property, wherein
  either one of the first light source or the second light source is selectively turned on, and
  the board and the separator wall are connected in a state in which light is blocked between a first space in which the first light source is disposed and a second space in which the second light source is disposed.

7. The display device according to claim 6, further comprising:
  a filler which fills a space between the board and the separator wall and connects the board and the separator wall, the filler having a light blocking property.

8. The display device according to claim 6, wherein the board and the separator wall are connected by the separator wall being inserted into a recess or a through-hole provided in the board.

9. The display device according to claim 6, wherein the board includes a material having a light-blocking property.

10. The display device according to claim 6, wherein the separator wall includes a wall surface having one of a dark portion, a matte portion, and a diffused reflection portion, on a side facing the second light source.

11. An input device, comprising:
  the display device according to claim 6; and
  a switch which detects pressure on the display device.

12. The input device according to claim 11, wherein the display device is configured to press the switch by moving toward the switch, upon being applied with the pressure.

13. The input device according to claim 11, wherein
the separator wall is connected to the board in a state in which, upon being applied with the pressure, the separator wall is configured to be movable toward the switch relative to the board, while keeping a state in which light is blocked at a connecting portion between the board and the separator wall.

14. The display device according to claim 1, wherein
at least one of
the convex lens is disposed to cover above the first light source on a first side to which the first light is emitted,
the light reducer is disposed on a surface above the second light source on a second side to which the second light is emitted, or
the light diffuser is disposed on the surface above the second light source on the second side to which the second light is emitted.

15. The display device according to claim 1, wherein
the mask body includes a plurality of light-transmissive portions,
the second light source includes a plurality of second light sources corresponding to each of the plurality of light-transmissive portions, and
the first light source includes a plurality of first light sources, a number of the plurality of first light sources being less than or equal to a number of the plurality of second light sources.

* * * * *